US012170402B2

(12) United States Patent
Tsai et al.

(10) Patent No.: US 12,170,402 B2
(45) Date of Patent: Dec. 17, 2024

(54) ELECTRONIC DEVICE

(71) Applicant: Huawei Technologies Co., Ltd., Shenzhen (CN)

(72) Inventors: Chih Yu Tsai, Taipei (CN); Chien-Ming Lee, Shenzhen (CN); Hanyang Wang, Reading (GB); Dong Yu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 151 days.

(21) Appl. No.: 17/918,026

(22) PCT Filed: Mar. 19, 2021

(86) PCT No.: PCT/CN2021/081696

§ 371 (c)(1),
(2) Date: Oct. 10, 2022

(87) PCT Pub. No.: WO2021/203942

PCT Pub. Date: Oct. 14, 2021

(65) Prior Publication Data

US 2023/0141980 A1 May 11, 2023

(30) Foreign Application Priority Data

Apr. 10, 2020 (CN) ......................... 202010280230.3

(51) Int. Cl.
*H01Q 1/52* (2006.01)
*H01Q 1/24* (2006.01)

(52) U.S. Cl.
CPC ............ *H01Q 1/521* (2013.01); *H01Q 1/243* (2013.01)

(58) Field of Classification Search
CPC ............................... H01Q 1/521; H01Q 1/243
See application file for complete search history.

(56) References Cited

U.S. PATENT DOCUMENTS

2014/0313089 A1 10/2014 Wu et al.
2014/0327584 A1 11/2014 Chang
(Continued)

FOREIGN PATENT DOCUMENTS

CN 103401061 A 11/2013
CN 104124524 A 10/2014
(Continued)

OTHER PUBLICATIONS

Nie Zaiping, Antenna Engineering Handbook, Jul. 2014, 4 pages.
(Continued)

*Primary Examiner* — Graham P Smith
(74) *Attorney, Agent, or Firm* — Conley Rose, P.C.

(57) ABSTRACT

An electronic device includes a decoupling member, a first radiator, a second radiator, a first feed unit, a second feed unit, and a rear cover. A gap is formed between the first radiator and the second radiator, the decoupling member is indirectly coupled to the first radiator and the second radiator, and the decoupling member is disposed on a surface of the rear cover. The decoupling member does not overlap a first projection, and the first projection is a projection of the first radiator in a first direction. The decoupling member does not overlap a second projection, and the second projection is a projection of the second radiator in the first direction. The first direction is a direction perpendicular to a plane on which the rear cover is located.

20 Claims, 16 Drawing Sheets

(56) References Cited

U.S. PATENT DOCUMENTS

| | | | |
|---|---|---|---|
| 2015/0109182 A1 | 4/2015 | Chen et al. | |
| 2016/0111794 A1 | 4/2016 | Yang | |
| 2021/0043998 A1 | 2/2021 | Qu et al. | |

FOREIGN PATENT DOCUMENTS

| | | | | |
|---|---|---|---|---|
| CN | 104467897 A | 3/2015 | | |
| CN | 106450674 A | 2/2017 | | |
| CN | 106981725 A | 7/2017 | | |
| CN | 207052763 U | 2/2018 | | |
| CN | 108736142 A | * 11/2018 | ............... | H01Q 1/36 |
| CN | 108767442 A | 11/2018 | | |
| CN | 108808222 A | 11/2018 | | |
| CN | 109462016 A | 3/2019 | | |
| CN | 208674372 U | 3/2019 | | |
| CN | 109980364 A | 7/2019 | | |
| CN | 110400779 A | 11/2019 | | |
| CN | 110492237 A | 11/2019 | | |
| WO | 2018170967 A1 | 9/2018 | | |
| WO | 2020019836 A1 | 1/2020 | | |

OTHER PUBLICATIONS

Zhang Mengyi, "A Dual-band MIMO Antenna with High Isolation for Internet of Things," Feb. 2018, 4 pages.

Angus C. K. Mak, et al., "Isolation Enhancement Between Two Closely Packed Antennas," in IEEE Transactions on Antennas and Propagation, vol. 56, No. 11, Nov. 2008, 9 pages.

Zhang Yu-qing, "A Novel Three-band Internal PIFA Antenna Used for Mobile Terminal," 2009, 3 pages.

* cited by examiner

No decoupling member is additionally disposed

A decoupling member is additionally disposed

ELECTRONIC DEVICE

CROSS-REFERENCE TO RELATED APPLICATIONS

This is a U.S. National Stage of International Patent Application No. PCT/CN2021/081696 filed on Mar. 19, 2021, which claims priority to Chinese Patent Application No. 202010280230.3 filed on Apr. 10, 2020, both of which are hereby incorporated by reference in their entireties.

TECHNICAL FIELD

This application relates to the field of wireless communication, and in particular, to an electronic device including a dual-antenna structure.

BACKGROUND

In the past, since a conventional second generation (second generation, 2G) mobile communication system mainly supported a call function, an electronic device was only a tool used by people to send and receive a text message and perform voice communication, and a wireless network access function was extremely slow because data was transmitted through a voice channel. With rapid development of wireless communication technologies, nowadays, in addition to making a call, sending a short message, and taking a photo, an electronic device can also be used to listen to music online, watch a network movie, make a video call in real time, and the like. That is, the electronic device covers various applications in people's life, such as a call application, a film and television entertainment application, and an e-commerce application. In this case, a plurality of functional applications need to upload and download data through a wireless network. Therefore, high-speed data transmission becomes extremely important.

As people's requirements for high-speed data transmission increase, how to effectively improve a transmission rate of an electronic device in a limited bandwidth is an important research topic. A multi-input multi-output (multi-input multi-output, MIMO) multi-antenna system is one of main core technologies at present. The MIMO multi-antenna system greatly improves a transmission rate by increasing a quantity of antennas at a transmit end and a receive end, and simultaneously transmitting and receiving data. However, in a MIMO multi-antenna design, when two antennas operate at a same frequency and are configured adjacent to each other, isolation between the two antennas is greatly improved. Therefore, how to make the two antennas achieve low coupling and a low envelope correlation coefficient (envelope correlation coefficient, ECC) and disposed in narrow space of an electronic device is a technical challenge that an antenna designer needs to break through.

SUMMARY

An embodiment of this application provides an electronic device. The electronic device may include a dual-antenna structure. In a configuration that two antennas are compactly arranged, high isolation can be achieved in a designed frequency band, and good radiation efficiency and low ECC of the antennas can also be maintained. Therefore, good communication quality is achieved.

According to a first aspect, an electronic device is provided, including: a decoupling member, a first radiator, a second radiator, a first feed unit, a second feed unit, and a rear cover, where a gap is formed between the first radiator and the second radiator. The first radiator includes a first ground point and a first feed point, the first feed unit provides feeding at the first feed point, and the first radiator is grounded at the first ground point. The second radiator includes a second ground point and a second feed point, the second feed unit provides feeding at the second feed point, and the second radiator is grounded at the second ground point. The decoupling member is indirectly coupled to the first radiator and the second radiator. The decoupling member is disposed on a surface of the rear cover. The decoupling member does not overlap a first projection, and the first projection is a projection of the first radiator on the rear cover in a first direction. The decoupling member does not overlap a second projection, and the second projection is a projection of the second radiator on the rear cover in the first direction. The first direction is a direction perpendicular to a plane on which the rear cover is located.

According to the technical solution in this embodiment of this application, a tail end of a radiator may be grounded, so that a size of an antenna can be reduced from an original half operating wavelength to a quarter wavelength. This greatly reduces an overall size of the antenna and maintains good radiation efficiency. When two antennas are compactly arranged and configured in narrow space in the electronic device, a neutralization line structure may be disposed near the two antennas by using a floating metal (floating metal, FLM) technology, so that isolation between the two antennas in a designed frequency band can be improved, current coupling between the two antennas can be effectively reduced, and radiation efficiency of the two antennas can be improved. Therefore, according to a dual-antenna design provided in this embodiment of this application, in a configuration that two antennas are compactly arranged, high isolation can be achieved in the designed frequency band, and good radiation efficiency and low ECC of the antennas can also be maintained. Therefore, good communication quality is achieved.

It should be understood that the decoupling member, the first radiator, the second radiator, the first feed unit, the second feed unit, and the rear cover may form a first antenna system. The electronic device may include two first antenna systems and a neutralization member. The two first antenna systems are arranged in a staggered manner, to improve isolation between feed points. In addition, radiators that are close to each other in two first antenna systems are indirectly coupled to the neutralization member, so as to improve isolation between feed points that are close to each other. The neutralization member may be disposed on the surface of the rear cover of the electronic device. The neutralization member may overlap projection parts of the two first antenna systems on the rear cover in the first direction.

With reference to the first aspect, in some implementations of the first aspect, the first ground point is disposed at an end that is of the first radiator and that is away from the gap. The first feed point is disposed between the first ground point and the gap. The second ground point is disposed at an end that is of the second radiator and that is away from the gap. The second feed point is disposed between the second ground point and the gap.

With reference to the first aspect, in some implementations of the first aspect, the first feed point is disposed at an end that is of the first radiator and is close to the gap. The second feed point is disposed at an end that is of the second radiator and that is close to the gap.

According to the technical solution in this embodiment of this application, when the first ground point is located at the end that is of the first radiator and that is away from the gap, and the first feed point is located in the middle of the first radiator, a first antenna formed by the first radiator is an IFA. When the first feed point and the first ground point are respectively located at two ends of the first radiator, a first antenna formed by the first radiator is a left-hand antenna. In an antenna structure, a second antenna and the first antenna use a same structure.

With reference to the first aspect, in some implementations of the first aspect, the first feed point is disposed at an end that is of the first radiator and that is away from the gap. The first ground point is disposed between the first feed point and the gap. The second ground point is disposed at an end that is of the second radiator and that is away from the gap. The second feed point is disposed between the second ground point and the gap.

According to the technical solution in this embodiment of this application, after the decoupling member is additionally disposed in the antenna structure, isolation between the first antenna and the second antenna can be effectively improved. The antenna structure provided in this embodiment of this application is not limited to symmetry between a structure of the first antenna formed by the first radiator and a structure of the second antenna formed by the second radiator.

With reference to the first aspect, in some implementations of the first aspect, the first radiator, the second radiator, and the decoupling member are symmetrical along the gap.

According to the technical solution in this embodiment of this application, the direction of the gap may be a direction in which a plane where the gap is located is perpendicular to the gap. It should be understood that the antenna has a symmetrical structure, and good antenna performance.

With reference to the first aspect, in some implementations of the first aspect, the antenna further includes an antenna support, and the first radiator and the second radiator are disposed on a surface of the antenna support.

According to the technical solution in this embodiment of this application, the first radiator and the second radiator may be disposed on the antenna support or a PCB of the electronic device according to an actual situation.

With reference to the first aspect, in some implementations of the first aspect, the decoupling member is disposed on a surface that is of the rear cover and that is close to the antenna support.

According to the technical solution in this embodiment of this application, the decoupling member may be disposed, based on an actual production and design requirement, on a surface that is of the rear cover and that is away from or close to the antenna support.

With reference to the first aspect, in some implementations of the first aspect, when the first feed unit provides feeding, the second radiator is coupled with the first radiator to generate a first induced current, and the second radiator is coupled with the decoupling member to generate a second induced current. A direction of the first induced current is opposite to a direction of the second induced current.

According to the technical solution in this embodiment of this application, a direction of an induced current generated by the first radiator on the second radiator is opposite to a direction of an induced current generated by the decoupling member on the second radiator, and the induced currents offset each other. This improves isolation between the first antenna formed by the first radiator and the second antenna formed by the second radiator.

With reference to the first aspect, in some implementations of the first aspect, when the second feed unit provides feeding, the first radiator is coupled with the second radiator to generate a third induced current, and the first radiator is coupled with the decoupling member to generate a fourth induced current. A direction of the third induced current is opposite to a direction of the fourth induced current.

According to the technical solution in this embodiment of this application, a direction of an induced current generated by the second radiator on the first radiator is opposite to a direction of an induced current generated by the decoupling member on the first radiator, and the induced currents offset each other. This improves isolation between the first antenna formed by the first radiator and the second antenna formed by the second radiator.

With reference to the first aspect, in some implementations of the first aspect, the first feed unit and the second feed unit are a same feed unit.

According to the technical solution in this embodiment of this application, both the first feed unit and the second feed unit may be a power supply chip of the electronic device.

With reference to the first aspect, in some implementations of the first aspect, a width of the gap ranges from 3 mm to 10 mm.

According to the technical solution in this embodiment of this application, when a distance between the first radiator and the second radiator is 3 mm, antenna performance is good. It should be understood that adjustment may be performed according to an actual design or production requirement.

With reference to the first aspect, in some implementations of the first aspect, a coupling gap between the decoupling member and each of the first radiator and the second radiator ranges from 0.1 mm to 3 mm.

According to the technical solution in this embodiment of this application, when the coupling gap between the decoupling member and each of the first radiator and the second radiator is 2 mm, antenna performance is good. It should be understood that adjustment may be performed according to an actual design or production requirement.

With reference to the first aspect, in some implementations of the first aspect, a length of the decoupling member is a half of a wavelength corresponding to a resonance point of resonance generated by the first radiator or the second radiator.

According to the technical solution in this embodiment of this application, the resonance point of the resonance generated by the first radiator or the second radiator may be a resonance point of resonance generated by the first antenna, or a resonance point generated by the second antenna, or may be a center frequency in an operating frequency band of an overall antenna structure. It should be understood that isolation between feed points of the antenna may be controlled by adjusting the length of the decoupling member. The length of the decoupling member may be adjusted to meet indicator requirements of antennas of different structures.

With reference to the first aspect, in some implementations of the first aspect, the electronic device further includes a first metal spring plate, a second metal spring plate, a third metal spring plate, and a fourth metal spring plate. One end of the first metal spring plate is grounded, and the other end is coupled to the first radiator at the first ground point. One end of the second metal spring plate is electrically connected to a feed unit, and the other end is coupled to the first radiator at the first feed point. One end of the third metal spring plate is grounded, and the other end is coupled to the second radiator at the second ground point. One end of the fourth metal spring plate is electrically connected to a feed unit, and the other end is coupled to the second radiator at the second feed point.

According to the technical solution in this embodiment of this application, the first radiator or the second radiator may be grounded or fed in a manner of coupling through a metal spring plate, and bandwidth performance of the first radiator or the second radiator is good.

With reference to the first aspect, in some implementations of the first aspect, the decoupling member is fold-line-shaped.

According to the technical solution in this embodiment of this application, in an extension design, if the decoupling member changes from straight-line-shaped to fold-line-shaped, radiation performance of the antenna structure in an operating frequency band can be further improved. At the same time, the structural design can improve a design freedom of the decoupling member in two-dimensional space.

With reference to the first aspect, in some implementations of the first aspect, the electronic device further includes a first parasitic stub and a second parasitic stub. The first parasitic stub is disposed on side of the first radiator that is away from the gap, and the second parasitic stub is disposed on side of the second radiator that is away from the gap.

According to the technical solution in this embodiment of this application, a plurality of parasitic stubs may be disposed near a radiator, so that more antenna modes may be excited. This further improves an efficiency bandwidth and radiation of an antenna.

With reference to the first aspect, in some implementations of the first aspect, the first parasitic stub includes a third ground point, and is disposed at an end that is of the first parasitic stub and that is away from the first radiator. The second parasitic stub includes a fourth ground point, and is disposed at an end that is of the second parasitic stub and that is away from the second radiator.

According to the technical solution in this embodiment of this application, an end that is of a parasitic stub and that is away from the radiator is grounded, so that a length of the parasitic stub can be shortened from a half of an operating wavelength to a quarter.

According to a second aspect, an electronic device is provided, including a decoupling member, a first radiator, a second radiator, a first feed unit, a second feed unit, and a rear cover. A gap is formed between the first radiator and the second radiator. The first radiator includes a first ground point and a first feed point, the first feed unit provides feeding at the first feed point, and the first radiator is grounded at the first ground point. The second radiator includes a second ground point and a second feed point, the second feed unit provides feeding at the second feed point, and the second radiator is grounded at the second ground point. The decoupling member is indirectly coupled to the first radiator and the second radiator, and the decoupling member is disposed on a surface of the rear cover. When the first feed unit provides feeding, the second radiator is coupled with the first radiator to generate a first induced current, the second radiator is coupled with the decoupling member to generate a second induced current, and a direction of the first induced current is opposite to a direction of the second induced current. When the second feed unit provides feeding, the first radiator is coupled with the second radiator to generate a third induced current, the first radiator is coupled with the decoupling member to generate a fourth induced current, and a direction of the third induced current is opposite to a direction of the fourth induced current.

With reference to the second aspect, in some implementations of the second aspect, the first ground point is disposed at an end that is of the first radiator and that is away from the gap. The first feed point is disposed between the first ground point and the gap. The second ground point is disposed at an end that is of the second radiator and that is away from the gap. The second feed point is disposed between the second ground point and the gap.

With reference to the second aspect, in some implementations of the second aspect, the first feed point is disposed at an end that is of the first radiator and is close to the gap, and the second feed point is disposed at an end that is of the second radiator and is close to the gap.

With reference to the second aspect, in some implementations of the second aspect, the first feed point is disposed at an end that is of the first radiator and that is away from the gap. The first ground point is disposed between the first feed point and the gap. The second ground point is disposed at an end that is of the second radiator and that is away from the gap. The second feed point is disposed between the second ground point and the gap.

With reference to the second aspect, in some implementations of the second aspect, the first radiator, the second radiator, and the decoupling member are symmetrical along the gap.

With reference to the second aspect, in some implementations of the second aspect, the electronic device further includes an antenna support, and the first radiator and the second radiator are disposed on a surface of the antenna support.

With reference to the second aspect, in some implementations of the second aspect, the decoupling member is disposed on a surface that is of the rear cover and that is close to the antenna support.

With reference to the second aspect, in some implementations of the second aspect, the first feed unit and the second feed unit are a same feed unit.

With reference to the second aspect, in some implementations of the second aspect, a width of the gap ranges from 3 mm to 10 mm.

With reference to the second aspect, in some implementations of the second aspect, a coupling gap between the decoupling member and each of the first radiator and the second radiator ranges from 0.1 mm to 3 mm.

With reference to the second aspect, in some implementations of the second aspect, a length of the decoupling member is a half of a wavelength corresponding to a resonance point of resonance generated by the first radiator or the second radiator.

With reference to the second aspect, in some implementations of the second aspect, the electronic device further includes a first metal spring plate, a second metal spring plate, a third metal spring plate, and a fourth metal spring plate. One end of the first metal spring plate is grounded, and the other end is coupled to the first radiator at the first ground point. One end of the second metal spring plate is electrically connected to a feed unit, and the other end is coupled to the first radiator at the first feed point. One end of the third metal spring plate is grounded, and the other end is coupled to the second radiator at the second ground point. One end of the fourth metal spring plate is electrically connected to a feed unit, and the other end is coupled to the second radiator at the second feed point.

With reference to the second aspect, in some implementations of the second aspect, the decoupling member is fold-line-shaped.

With reference to the second aspect, in some implementations of the second aspect, the electronic device further includes a first parasitic stub and a second parasitic stub. The first parasitic stub is disposed on side of the first radiator that is away from the gap, and the second parasitic stub is disposed on side of the second radiator that is away from the gap.

With reference to the second aspect, in some implementations of the second aspect, the first parasitic stub includes a third ground point, and is disposed at an end that is of the first parasitic stub and that is away from the first radiator. The second parasitic stub includes a fourth ground point, and is disposed at an end that is of the second parasitic stub and that is away from the second radiator.

DESCRIPTION OF EMBODIMENTS

The following describes technical solutions of this application with reference to accompanying drawings.

An electronic device in embodiments of this application may be a mobile phone, a tablet computer, a notebook computer, a smart band, a smartwatch, a smart helmet, smart glasses, or the like. Alternatively, the electronic device may be a cellular phone, a cordless phone, a session initiation protocol (session initiation protocol, SIP) phone, a wireless local loop (wireless local loop, WLL) station, a personal digital assistant (personal digital assistant, PDA), a handheld device with a wireless communication function, a computing device or another processing device connected to a wireless modem, an in-vehicle device, a terminal device in a 5G network, a terminal device in a future evolved public land mobile network (public land mobile network, PLMN), or the like. This is not limited in this embodiment of this application.

Figure 1:
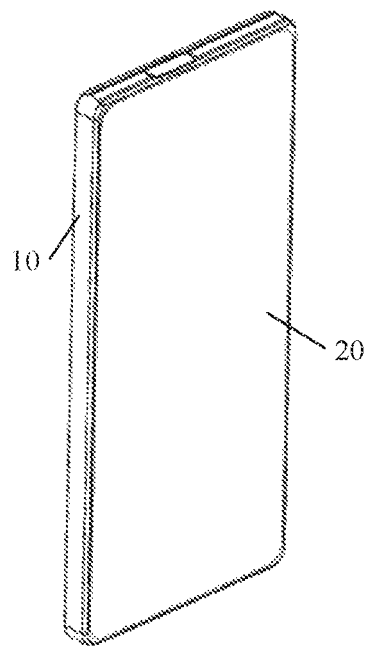
FIG. 1 is a schematic diagram of an electronic device according to an embodiment of this application.

FIG. 1 is a schematic diagram of an electronic device according to an embodiment of this application. Herein, an example in which the electronic device is a mobile phone is used for description.

As shown in FIG. 1, the electronic device has a shape similar to a cube, and may include a bezel 10 and a display 20. Both the bezel 10 and the display 20 may be mounted on a middle frame (not shown in the figure). The bezel 10 may be divided into an upper bezel, a lower bezel, a left bezel, and a right bezel. These bezels are connected to each other, and may form a specific radian or chamfer at a joint.

The electronic device further includes a printed circuit board (printed circuit board, PCB) disposed inside. An electronic element may be disposed on the PCB. The electronic element may include a capacitor, an inductor, a resistor, a processor, a camera, a flash, a microphone, a battery, or the like, but is not limited thereto.

The bezel 10 may be a metal bezel made of metals such as copper, a magnesium alloy, or stainless steel, or may be a plastic bezel, a glass bezel, a ceramic bezel, or the like, or may be a bezel combining metal and plastic.

As a user's requirement for a data transmission rate increases, a capability of simultaneous transmission and simultaneous reception of a MIMO multi-antenna system gradually attracts attention. It can be seen that an operation of the MIMO multi-antenna system becomes a trend in the future. However, how to integrate and implement the MIMO multi-antenna system in an electronic device with limited space and achieve good antenna radiation efficiency of each antenna is a technical challenge that is difficult to overcome. When several antennas operating in a same frequency band are jointly designed in a same electronic device with limited space, a distance between the antennas is excessively short, and interference between the antennas becomes increasingly severe, that is, isolation between the antennas is greatly improved. In addition, ECC among a plurality of antennas may be improved, so that a case in which radiation of an antenna is weakened may occur. Consequently, a decrease in the data transmission rate is caused, and a technical difficulty in a multi-antenna integration design is increased.

Figure 2:
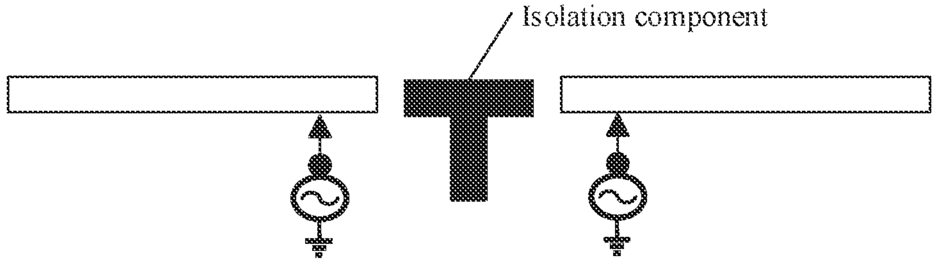
FIG. 2 is a schematic diagram of an antenna structure.

As shown in FIG. 2, some documents in the conventional technology have proposed that an isolation component (for example, a protruding ground plane, a short-circuit metal component, or a spiral groove) is additionally disposed between two antennas, and a size of the isolation component is designed to be close to a resonance frequency of a frequency band of the two antennas for improving isolation, so as to reduce current coupling between the antennas. However, this design reduces current coupling between antennas, and also reduces radiation efficiency of the antennas. In addition, the use of the isolation component requires specific space for configuration. This also increases a design size of an overall antenna structure. In addition, a specific ground plane shape is used to improve the isolation between the two antennas. Generally, an L-shaped groove structure is cut on the ground plane of the two antennas, so that current coupling between the two antennas can be reduced. However, the groove structure occupies a large area, so that impedance matching and radiation of other antennas are easily affected. In addition, such a design manner may trigger an additional coupling current, thereby increasing an envelope correlation coefficient between adjacent antennas. In the foregoing technologies for improving isolation between two antennas, the use of the isolation component requires specific space for configuration, so that an overall design size of an antenna is increased. Therefore, an electronic device cannot meet a multi-antenna design requirement of high efficiency and miniaturization at the same time.

Embodiments of this application provide a dual-antenna technical solution. A tail end of a radiator may be grounded, so that a size of an antenna can be reduced from an original half operating wavelength to a quarter wavelength. This greatly reduces an overall size of the antenna and maintains good radiation efficiency. When two antennas are compactly arranged and configured in narrow space in the electronic device, a neutralization line structure may be disposed near the two antennas by using a floating metal (floating metal, FLM) technology, so that isolation between the two antennas in a designed frequency band can be improved, current coupling between the two antennas can be effectively reduced, and radiation efficiency of the two antennas can be improved. Therefore, according to a dual-antenna design provided in this embodiment of this application, in a configuration that two antennas are compactly arranged, high isolation can be achieved m the designed frequency band, and good radiation efficiency and low ECC of the antennas can also be maintained. Therefore, good communication quality is achieved.

Figure 3:
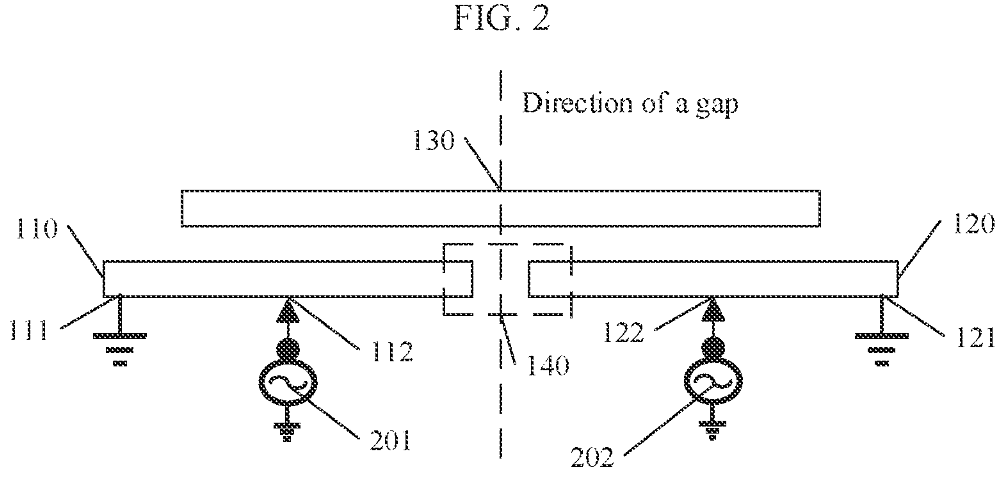
FIG. 3 is a schematic diagram of an antenna structure according to an embodiment of this application.
Figure 4:
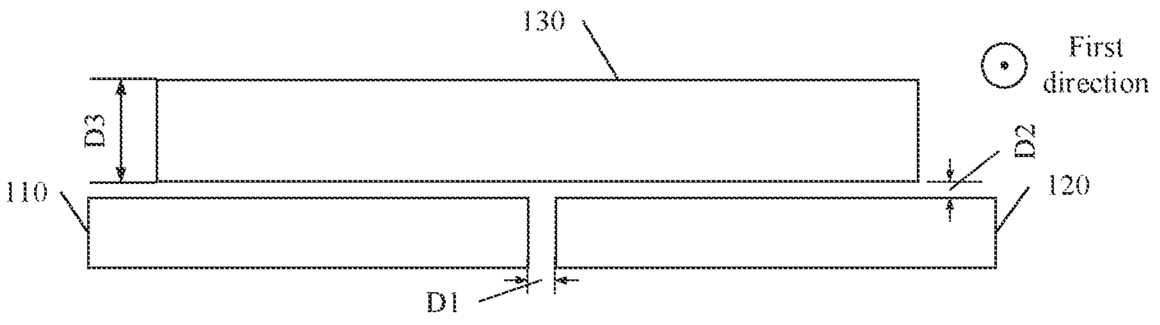
FIG. 4 is a top view of an antenna according to an embodiment of this application.
Figure 5:
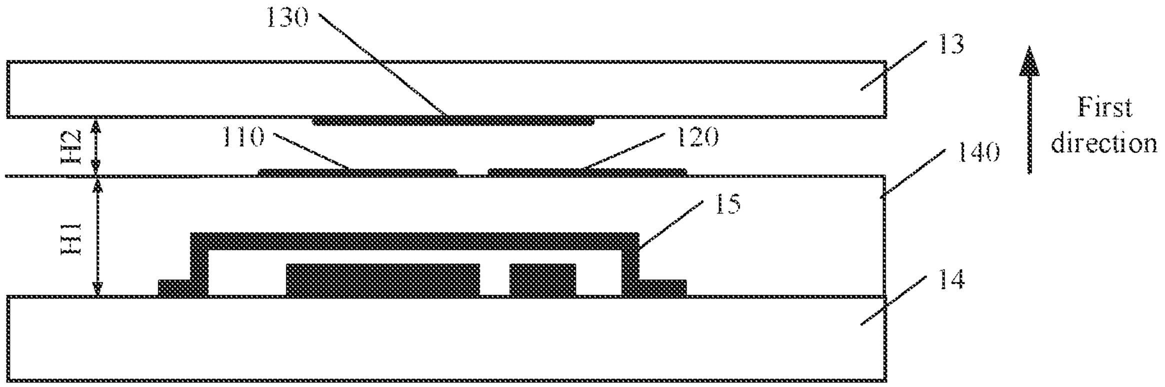
FIG. 5 is a side view of an antenna according to an embodiment of this application.
Figure 6:
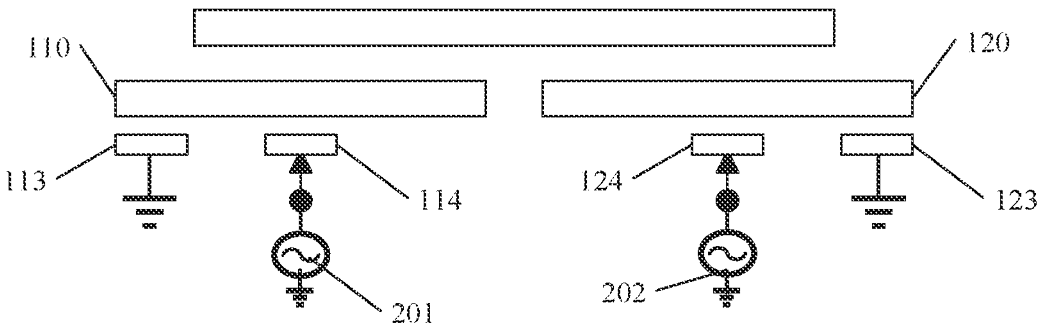
FIG. 6 is a schematic diagram of another antenna structure according to an embodiment of this application.

FIG. 3 to FIG. 6 are each a schematic diagram of an antenna structure according to an embodiment of this application. The antennas may be applied to an electronic device. FIG. 3 is a schematic diagram of an antenna structure according to an embodiment of this application. FIG. 4 is a top view of an antenna according to an embodiment of this application. FIG. 5 is a side view of an antenna according to an embodiment of this application. FIG. 6 is a schematic diagram of another antenna structure according to an embodiment of this application.

As shown in FIG. 3, the antennas may include a first radiator 110, a second radiator 120, and a decoupling member 130.

A gap 140 is formed between the first radiator 110 and the second radiator 120. The first radiator 110 may include a first ground point 111 and a first feed point 112, and may be located on a surface of the first radiator. The first radiator 110 may be grounded at the first ground point 111, and may be electrically connected to the first feed unit 201 at the first feed point 112. The first feed unit 201 provides energy for the antenna, to form a first antenna. The second radiator 120 may include a second ground point 121 and a second feed point 122, and may be located on a surface of the second radiator. The second radiator 120 may be grounded at the second ground point 121, and may be electrically connected to the second feed unit 202 at the second feed point 122. The second feed unit 202 provides energy for the antenna, to form a second antenna. A specific form of the first antenna or the second antenna is not limited in this application, and may be an inverted-F antenna (inverted-F antenna, IFA), a left-hand antenna, a loop (loop) antenna, or the like. For ease of description, the following embodiments are described by using the first antenna and the second antenna as IFAs or left-hand antennas. As shown in FIG. 3, when the first ground point is located at an end that is of the first radiator and that is away from the gap, and the first feed point is located in the middle of the first radiator, the first antenna is an IFA. When the first feed point and the first ground point are respectively located at two ends of the first radiator, the first antenna is a left-hand antenna. In an antenna structure, the second antenna and the first antenna use a same structure.

The decoupling member 130 is indirectly coupled to the first radiator 110 and the second radiator 120. It should be understood that indirect coupling is a concept relative to direct coupling, that is, mid-air coupling, it means that the decoupling member 130 and the first radiator 110 or the second radiator 120 are not directly electrically connected.

Optionally, the first feed unit 201 and the second feed unit 202 may be a same feed unit, for example, may be a power supply chip in an electronic device.

It should be understood that in the electronic device, the feed unit may be a middle frame of the electronic device or a metal plating layer on a PCB. The PCB is formed by press-fitting a plurality of layers of dielectric plates, and a metal plating layer exists in the plurality of layers of dielectric plates, and may be used as a reference ground of the antenna.

The first ground point 111 may be disposed at an end that is of the first radiator 110 and that is away from the gap 140. The first feed point 112 may be disposed between the first ground point 111 and the gap 140. The second ground point 121 may be disposed at an end that is of the second radiator 120 and that is away from the gap 140. The second feed point 122 may be disposed between the second ground point 121 and the gap 140.

Optionally, the end that is of the first radiator 110 or the second radiator 120 and that is away from the gap 140 may be a distance from an end point of the first radiator 110 or the second radiator 120, rather than just a point.

Optionally, the first radiator 110, the second radiator 120, and the decoupling member 130 may be symmetrical along the gap 140. The direction of the gap 140 may be a direction in which a plane where the gap 140 is located is perpendicular to the gap. It should be understood that the antenna has a symmetrical structure, and good antenna performance.

As shown in FIG. 4 and FIG. 5, the decoupling member 130 may be disposed on a surface of the rear cover 13 of the electronic device, and is configured to improve isolation between a first antenna formed by the first radiator 110 and a second antenna formed by the second radiator 120.

The decoupling member 130 does not overlap a first projection, and the first projection is a projection of the first radiator 110 on the rear cover 13 in a first direction. The decoupling member 130 does not overlap a second projection, and the second projection is a projection of the second radiator 120 on the rear cover 13 in the first direction. The first direction is a direction perpendicular to a plane on which the rear cover 13 is located. It should be understood that, being perpendicular to the plane on which the rear cover 13 is located may be understood as being having an included angle of approximately 90° with the plane on which the rear cover 13 is located. It should be understood that, being perpendicular to the plane on which the rear cover is located is also equivalent to being perpendicular to a plane on which a screen, a middle frame, or a mainboard of the electronic device is located.

Optionally, the rear cover 13 of the electronic device may be made of a nonmetallic material such as glass or ceramic.

Optionally, a length of the decoupling member 130 may be a half of a wavelength corresponding to a resonance point of resonance generated by an antenna. It should be understood that the resonance point of the resonance generated by the antenna may be a resonance point of the resonance generated by the first antenna, or a resonance point generated by the second antenna, or may be a center frequency in an operating frequency band of the antenna. When the antenna works in a N77 frequency band (3.4 GHz to 3.6 GHz), the length of the decoupling member 130 may be 33 mm.

It should be understood that, isolation between feed points of the antenna may be controlled by adjusting the length of the decoupling member 130. The length of the decoupling member 130 may be adjusted to meet indicator requirements of antennas of different structures.

Optionally, a distance D1 between the first radiator 110 and the second radiator 120 may be 3 mm, 4 mm, or 5 mm. For ease of description, in this embodiment of this application, that the distance D1 between the first radiator 110 and the second radiator 120 is 4 mm is used as example for description, that is, a width of the gap is 4 mm. A coupling gap D2 between the decoupling member 130 and each of the first radiator 110 and the second radiator 120 in a horizontal direction may be 1.6 mm. A width D3 of the decoupling member 130 may be 2.5 mm. It should be understood that a specific value of the distance D1, the coupling gap D2, or the width D3 is not limited in this application, and may be adjusted based on an actual design or production requirement.

It should be understood that the width D1 of the gap may be a straight-line distance between points closest to the first radiator 110 and the second radiator 120. The coupling gap D2 between the decoupling member 130 and each of the first radiator 110 and the second radiator 120 in the horizontal direction may be considered as a straight-line distance between the decoupling member 130 and a point closest to the first radiator 110 or the second radiator 120 in the horizontal direction.

Optionally, the width D1 of the gap may range from 3 mm to 10 mm.

Optionally, the coupling gap D2 may range from 0.1 mm to 3 mm.

Optionally, the coupling gap D2 between the decoupling member 130 and each of the first radiator 110 and the second radiator 120 in the horizontal direction is adjusted, so that a location of the antenna at an isolation peak in a designed frequency band can be effectively controlled. By adjusting the width D3 of the decoupling member 130, a frequency increase/decrease location at the isolation peak of the antenna in the designed frequency band can also be controlled. In addition, this adjustment manner has little impact on a radiation mode of the antenna in the frequency band, and related adjustment may be performed according to a setting requirement.

Optionally, the antenna may further include an antenna support 150, and the first radiator 110 and the second radiator 120 may be disposed on a surface of the antenna support.

It should be understood that the first radiator 110 and the second radiator 120 may alternatively be disposed on a surface of a PCB of the electronic device, and the decoupling member 130 may be disposed on the antenna support or the rear cover of the electronic device.

Optionally, the antenna support 150 may be disposed between a PCB 14 and the rear cover 13 of the electronic device. A shielding can 15 may be disposed on a surface that is of the PCB 14 and that is close to the antenna support, and the shielding can 15 may be configured to protect an electronic element on the PCB 14 from interference from an external electromagnetic environment. The decoupling member 130 may be disposed on a surface that is of the rear cover 13 and that is close to the antenna support 150. A distance H1 between the PCB 14 and the antenna support 150 may be 2.4 mm, a distance H2 between the antenna support 150 and the rear cover 13 may be 0.3 mm, and a thickness of the rear cover 13 may be 0.8 mm.

It should be understood that, when the first antenna and the second antenna are compactly arranged and configured in narrow space of the electronic device, radiation portions of the two antennas are coupled to the decoupling member, so that isolation between the two antennas in a designed frequency band can be improved, current coupling between the two antennas can be effectively reduced, and radiation efficiency of the two antennas can be improved. A design manner in which the decoupling member is coupled to radiators of two antennas is different from a conventional design manner in which the decoupling member is directly connected to radiators of two antennas or the decoupling member is disposed between radiators. In this application, the decoupling member is disposed on the rear cover of the electronic device, so that the antenna integrally occupies a small area, and has a compact structure.

As shown in FIG. 6, the antennas may further include a first metal spring plate 113, a second metal spring plate 114, a third metal spring plate 123, and a fourth metal spring plate 124.

One end of the first metal spring plate 113 is grounded, and the other end is coupled to the first radiator 110 at the first ground point, that is, the first radiator 110 is coupled and grounded at the first ground point. One end of the second metal spring plate 114 is electrically connected to the first feed unit 201, and the other end is coupled to the first radiator 110 at the first feed point, that is, the first feed unit 201 is coupled to and feeds the first radiator 110 at the first feed point. In this case, the first antenna formed by the first radiator is a coupling inverted-F antenna. One end of the third metal spring plate 123 is grounded, and the other end is coupled to the second radiator 120 at the second ground point, that is, the second radiator 120 is coupled and grounded at the second ground point. One end of the fourth metal spring plate is electrically connected to the second feed unit 202, and the other end is coupled to the second radiator 120 at the second feed point, that is, the second feed unit 202 is coupled to and feeds the second radiator 120 at the second feed point. In this case, the second antenna formed by the second radiator is a coupling inverted-F antenna.

Optionally, coupling connection may be a direct coupling connection or an indirect coupling connection.

It should be understood that, to implement a coupled grounding or coupled feeding structure in the antenna structure, a metal patch may also be designed on a PCB of the electronic device. After the metal patch is disposed on the PCB, a distance between the metal patch and the radiator increases. Therefore, a coupling area can be correspondingly increased, and a same effect can also be achieved. A manner of coupled feeding or coupled grounding is not limited in this application.

Figure 7:
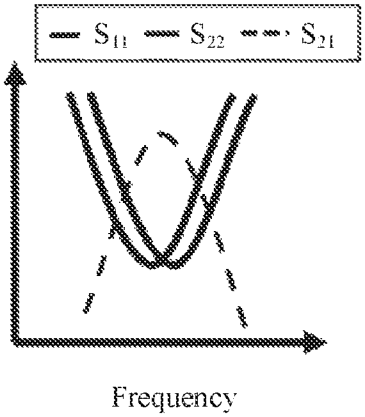
FIG. 7 is a schematic diagram of comparison between S parameters of different antenna structures according to an embodiment of this application.
Figure 7:
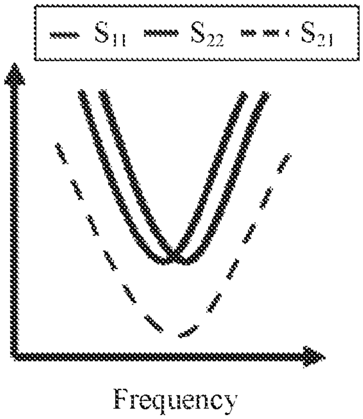

FIG. 7 is a schematic diagram of comparison between S parameters of different antenna structures according to an embodiment of this application. On a left side, there is a simulation result diagram of an antenna structure in which no decoupling member is additionally deposed. On a right side, there is a simulation result diagram of an antenna structure in which a decoupling member is additionally disposed.

In the antenna structure shown in FIG. 6, both the first antenna and the second antenna are coupling inverted-F antennas. When no decoupling member is additionally disposed in the antenna structure, and a distance between the first antenna and the second antenna is 4 mm, near-field current coupling between the two antennas is high. As a result, isolation between the first antenna and the second antenna in a common operating frequency band is poor. As shown in a left simulation diagram in FIG. 7, it is expected that this result is difficult to be applied to a MIMO multi-antenna system. However, after the decoupling member is additionally disposed in the antenna structure, when the distance between the first antenna and the second antenna is also 4 mm and each radiator is coupled with the decoupling member, because there is a coupling gap between each radiator and the decoupling member, a surface current of a ground part of the electronic device may be bound to the decoupling member. In other words, in the technical solution of this application, a current coupled from the first feed point of the first antenna to the second feed point of the second antenna can be offset, so as to improve near-field isolation between the two antennas and improve efficiency performance of the two antennas, as shown in a right simulation diagram in FIG. 7.

It should be understood that a location of an isolation peak between the two antennas in a designed frequency band can be effectively controlled by adjusting a width D3 of the decoupling member. This has little impact on a modal of the two antennas.

Figure 8:
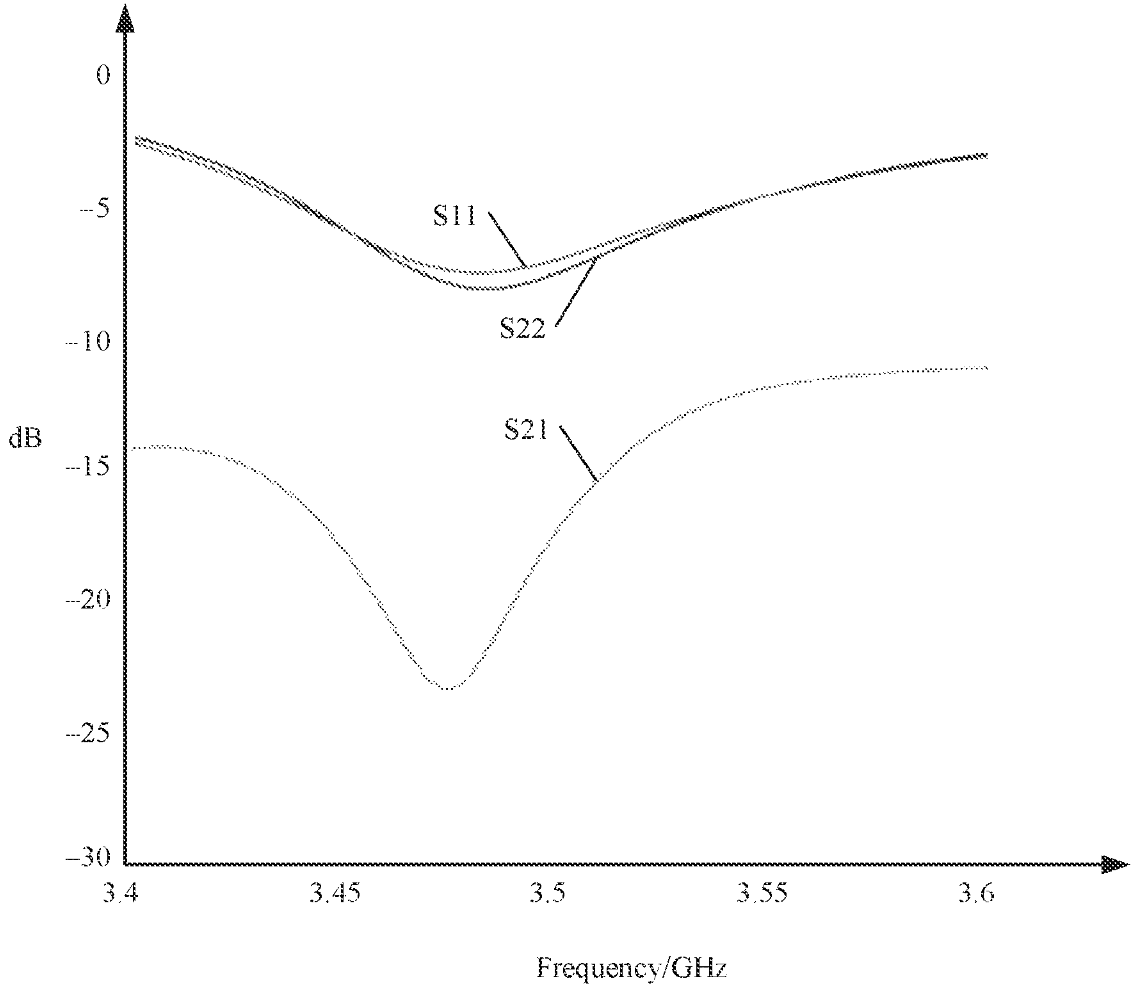
FIG. 8 is an S parameter simulation result of the antenna structure shown in FIG. 6.
Figure 9:
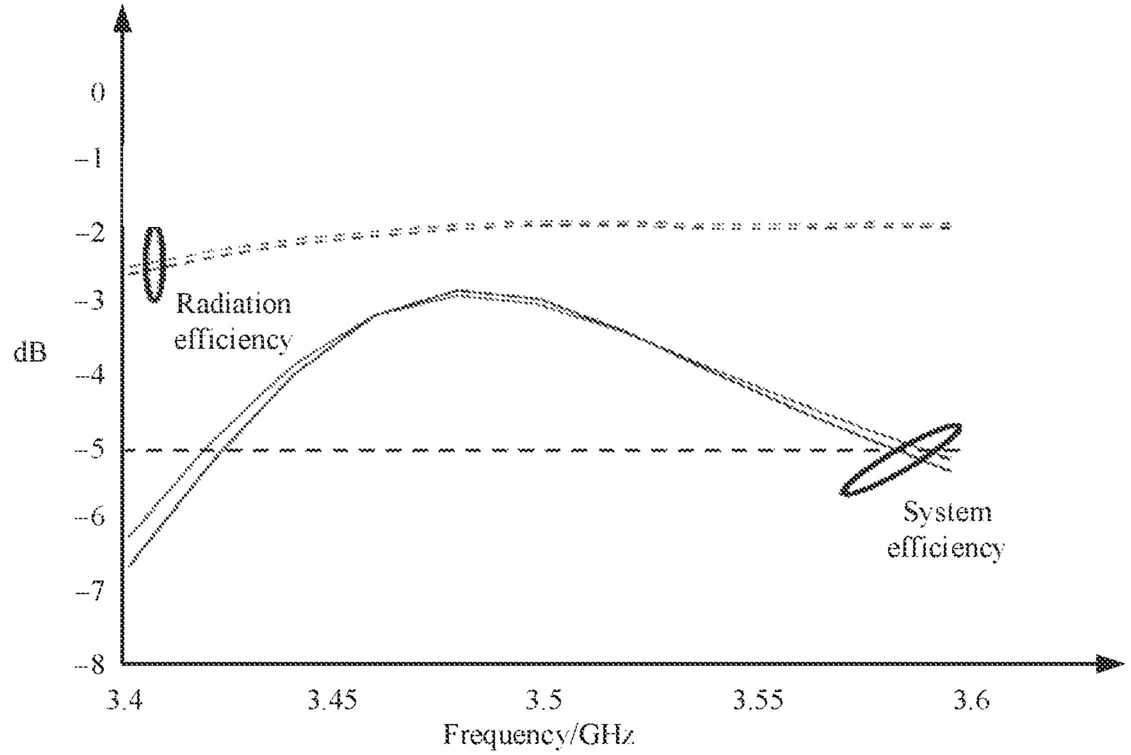
FIG. 9 is an efficiency simulation result of the antenna structure shown in FIG. 6.
Figure 10:
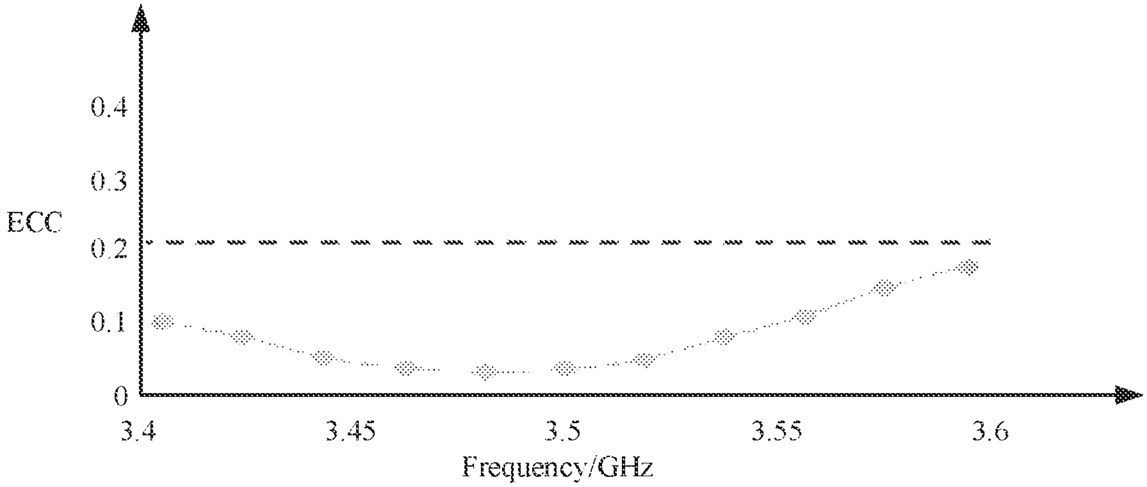
FIG. 10 is an ECC simulation result of the antenna structure shown in FIG. 6.

FIG. 8 to FIG. 10 are schematic diagrams of simulation results of the antenna structure shown in FIG. 6.

FIG. 8 is an S parameter simulation result of the antenna structure shown in FIG. 6. FIG. 9 is an efficiency simulation result of the antenna structure shown in FIG. 6. FIG. 10 is an ECC simulation result of the antenna structure shown in FIG. 6. As shown in FIG. 8, the antenna structure provided in this embodiment of this application may operate in an N77 frequency band (3.4 GHz to 3.6 GHz), and isolation in the operating frequency band is greater than 11 dB. System efficiency of the antenna structure provided in this embodiment of this application in the frequency band from 3.4 GHz to 3.6 GHz can approximately meet −5 dB, and ECC is less than 0.2 in the frequency band. This result is applicable to a MIMO system.

It can be learned from a simulation result of a parameter S that, when no decoupling member is additionally disposed in the antenna structure, isolation in the frequency band from 3.4 GHz to 3.6 GHz is very poor, and isolation in a 3.48 GHz frequency band is 2.4 dB. When a decoupling member is additionally disposed in the antenna structure, an isolation peak may be generated in an operating frequency band, and isolation in a 3.48 GHz frequency band is improved from 2.4 dB to 22 dB. However, a decoupling effect of the antenna structure provided in this embodiment of this application may also be reflected in radiation efficiency of an antenna. After the decoupling member is additionally disposed in the antenna structure, because intra-band isolation is improved, radiation efficiency is improved by about 3 dB.

Figure 11:
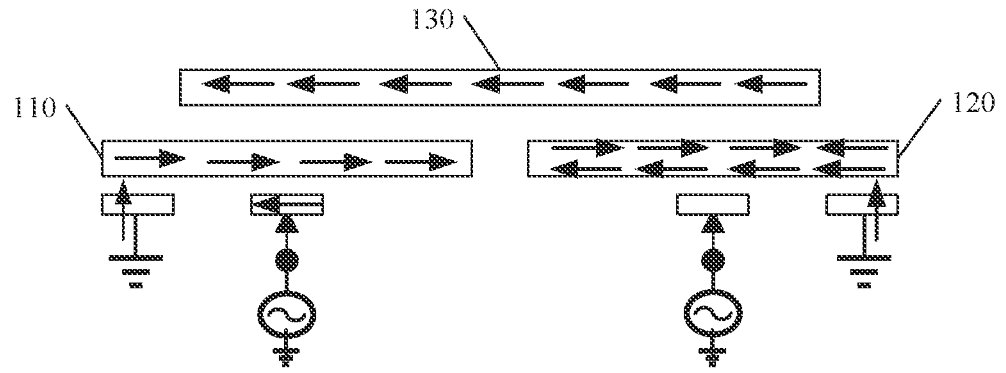
FIG. 11 is a distribution diagram of currents when a first feed unit provides feeding according to an embodiment of this application.
Figure 12:
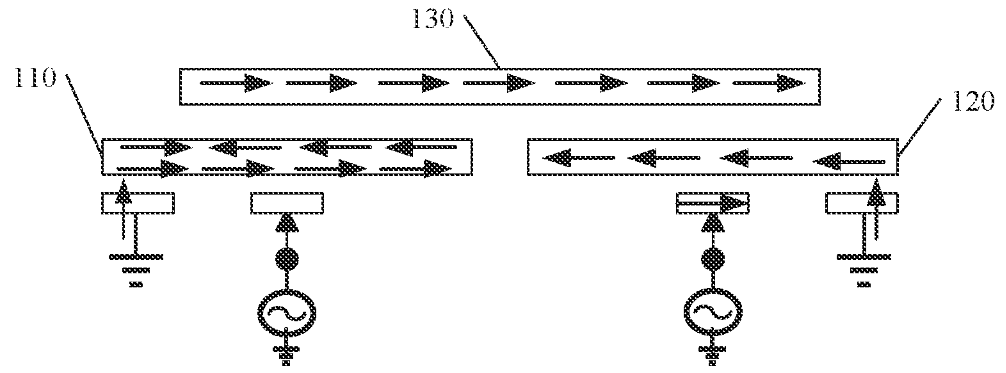
FIG. 12 is a distribution diagram of currents when a second feed unit provides feeding according to an embodiment of this application.

FIG. 11 and FIG. 12 are each a schematic diagram of current distribution according to an embodiment of this application. FIG. 11 is a distribution diagram of currents when a first feed unit provides feeding. FIG. 12 is a distribution diagram of currents when a second feed unit provides feeding.

If the decoupling member 130 is not additionally disposed in an antenna structure, when a feed unit provides feeding at a first feed point and a first antenna is excited, a strong current on a surface of the ground plane is guided to the second radiator 120. That is, there is strong current coupling between the first feed point and a second feed point, so that isolation between the first antenna and a second antenna deteriorates. On the contrary, if the decoupling member 130 is additionally disposed in an antenna structure, a strong surface current is bound to the decoupling member 130, as shown in FIG. 11. In addition, the second radiator 120 has a small surface current, which effectively reduces current coupling between the first feed point and the second feed point, so that the first antenna and the second antenna achieve high near-field isolation. In addition, when the decoupling member 130 is not additionally disposed in the antenna structure, directions of currents on the first radiator 110 and the second radiator 120 are symmetrical. When the decoupling member 130 is additionally deposed in the antenna structure, some directions of currents on the first radiator 110 and the second radiator 120 are asymmetrical, to offset a current coupled from the first feed point of the first antenna to the second feed point of the second antenna. This improves isolation between the first antenna and the second antenna. It should be understood that, a current that is generated on a surface of the second radiator 120 and that is symmetrical to a current on the first radiator 110 in direction is a first induced current coupled by the first radiator 110 to the second radiator 120. A current that is generated on the surface of the second radiator 120 and that is asymmetrical to the current on the first radiator 110 in direction is a second induced current coupled by the decoupling member 130 to the second radiator 120. The direction of the induced current generated by the first radiator 110 on the second radiator 120 is opposite to the direction of the induced current generated by the decoupling member 130 on the second radiator 120, and the induced currents offset each other. This improves isolation between the first antenna and the second antenna.

As shown in FIG. 12, when a feed unit provides feeding at a second feed point and a second antenna is excited, a similar case is observed for a surface current, so that a first antenna and the second antenna also achieve high near-field isolation. Therefore, the decoupling member 130 coupled between the first antenna and the second antenna may be considered as a decoupling structure in an antenna structure, so that the antennas achieve low coupling. It should be understood that, a current that is generated on a surface of the first radiator 110 and that is symmetrical to a current on the second radiator 120 in direction is a third induced current coupled by the second radiator 120 to the first radiator 110. A current that is generated on the surface of the first radiator 110 and that is asymmetrical to the current on the second radiator 120 in direction is a fourth induced current coupled by the decoupling member 130 to the first radiator 110. The direction of the induced current generated by the second radiator 120 on the first radiator 110 is opposite to the direction of the induced current generated by the decoupling member 130 on the first radiator 110, and the induced currents offset each other. This improves isolation between the first antenna and the second antenna.

Figure 13:
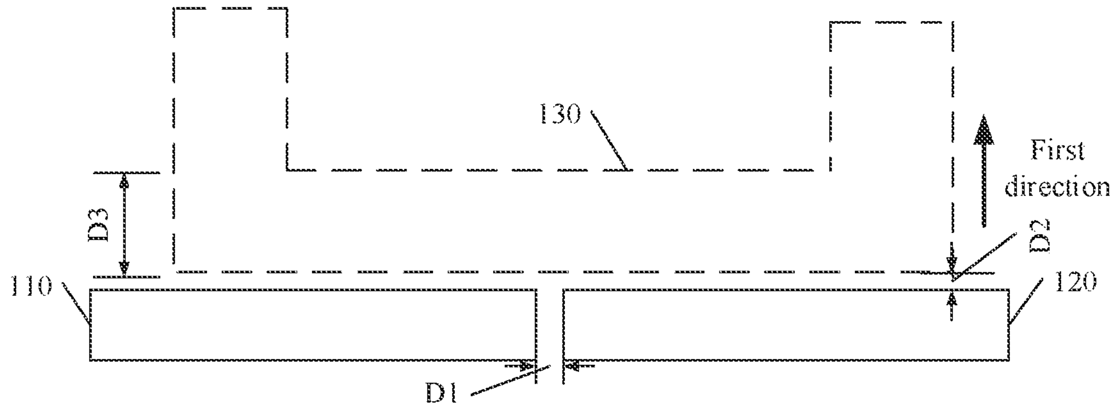
FIG. 13 is a top view of another antenna according to an embodiment of this application.

FIG. 13 is a top view of another antenna according to an embodiment of this application.

As shown in FIG. 13, the decoupling member 130 may be fold-line-shaped. For ease of description, an example in which a decoupling member is U-shaped is used in the following embodiment. It should be understood that a shape of the decoupling member 130 is not limited in this application.

Optionally, a distance D1 between the first radiator 110 and the second radiator 120 may be 4 mm, that is, a width of a gap is 4 mm. A coupling gap D2 between the decoupling member 130 and each of the first radiator 110 and the second radiator 120 in a horizontal direction may be 1.7 mm. A width D3 of the decoupling member 130 may be 2.5 mm. A length of the decoupling member 130 may be a half of an operating wavelength, and may be 38 mm.

It should be understood that a design of a U-shaped decoupling member is similar to a decoupling effect of a straight-line decoupling member shown in FIG. 3. Therefore, the decoupling member 130 coupled between the first antenna and the second antenna may be considered as a decoupling structure in an antenna structure, so that the antennas achieve low coupling.

Figure 14:
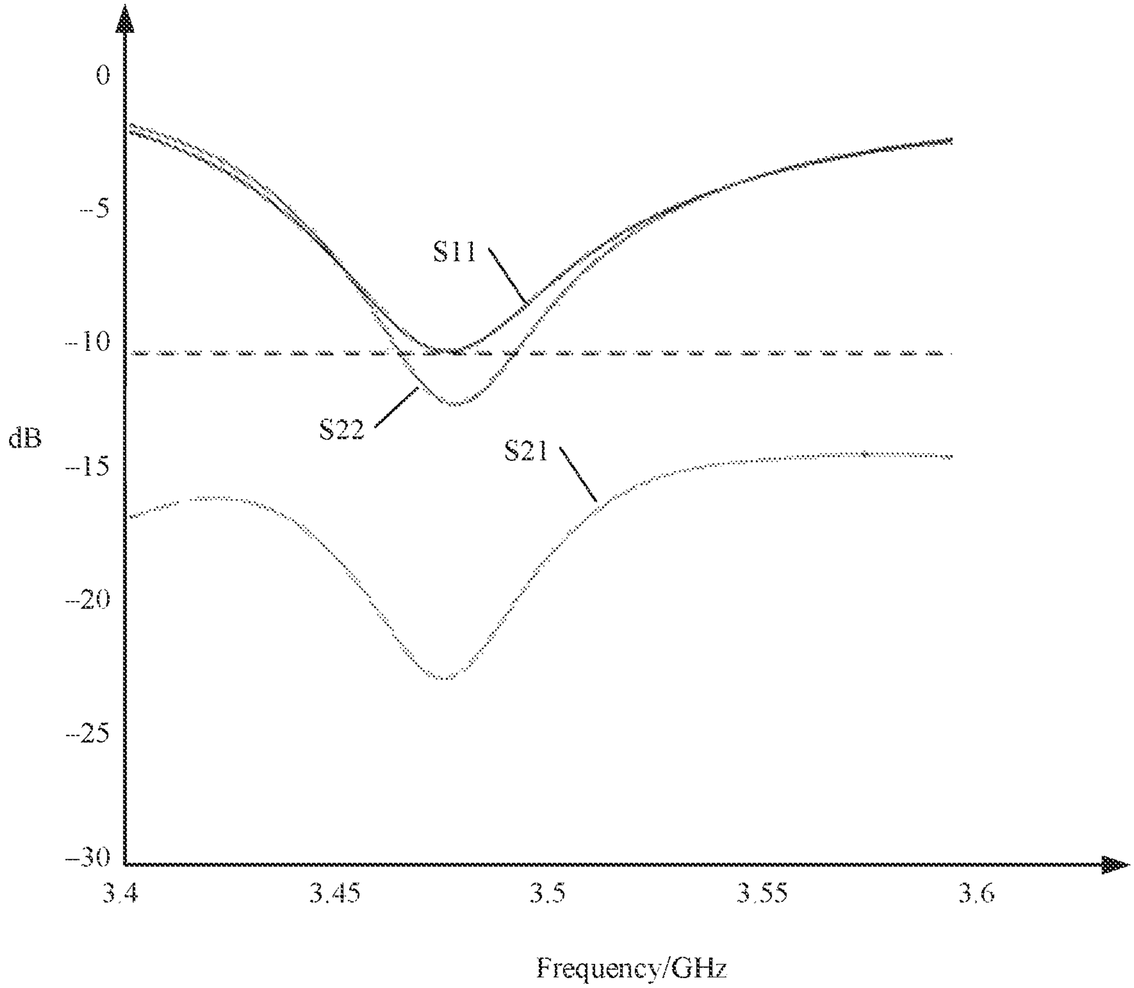
FIG. 14 is an S parameter simulation result of the antenna structure shown in FIG. 13.
Figure 15:
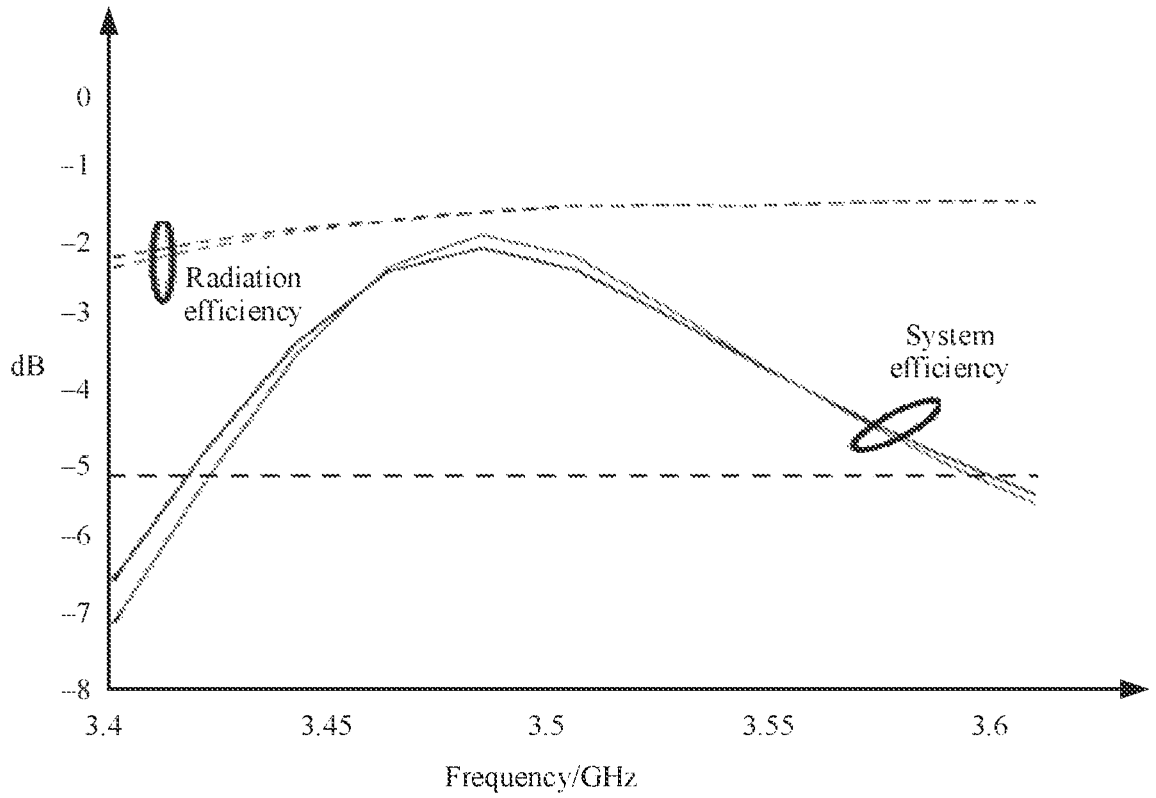
FIG. 15 is an efficiency simulation result of the antenna structure shown in FIG. 13.

FIG. 14 and FIG. 15 are schematic diagrams of simulation results of the antenna structure shown in FIG. 13. FIG. 14 is an S parameter simulation result of the antenna structure shown in FIG. 13. FIG. 15 is an efficiency simulation result of the antenna structure shown in FIG. 13.

As shown in FIG. 14, the antenna structure provided in this embodiment of this application may operate in an N77 frequency band (3.4 GHz to 3.6 GHz), and isolation in the frequency band is greater than 13 dB. As shown in FIG. 15, system efficiency in the frequency band from 3.4 GHz to 3.6 GHz approximately meets −5 dB, and this result is suitable for a MIMO system.

It should be understood that, in an extension design, if the decoupling member changes from straight-line-shaped to fold-line-shaped, radiation performance of the antenna structure in an operating frequency band can be further improved. At the same time, the structural design can improve a design freedom of the decoupling member in two-dimensional space.

The simulation results show that antenna decoupling can improve isolation in a frequency band by using a straight-line or U-shaped decoupling member to generate an isolation peak. However, because two open ends of the U-shaped decoupling member are far away from the first radiator and the second radiator of the antenna, impedance matching of the antenna in an operating frequency band is good. Therefore, the antenna also has high radiation efficiency in the operating frequency band.

Figure 16:
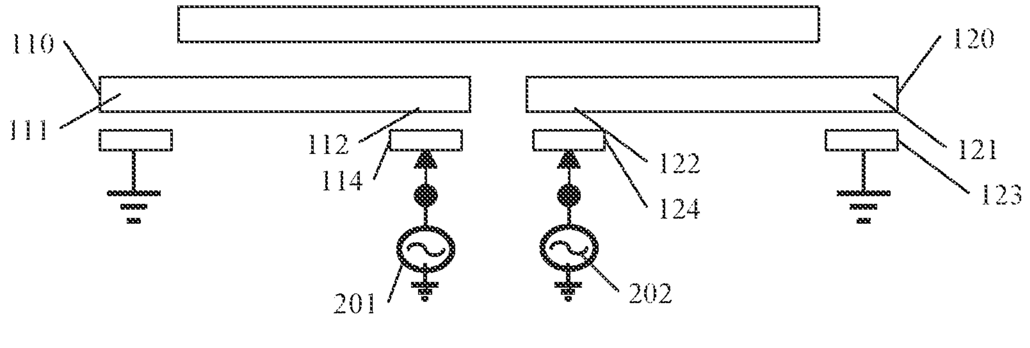
FIG. 16 is a schematic diagram of still another antenna structure according to an embodiment of this application.

FIG. 16 is a schematic diagram of still another antenna structure according to an embodiment of this application.

As shown in FIG. 16, the first ground point 111 and the first feed point 112 are respectively located at two ends of the first radiator 110. The first feed point 112 may be disposed at an end that is of the first radiator 110 that is close to a gap. The first radiator 110 may be coupled and grounded at the first ground point 111 through the first metal spring plate 113, and the first feed unit 201 may perform coupled feeding at the first feed point 112 through the second metal spring plate 114, to form a first antenna. In this case, the first antenna is a left-hand antenna.

The second ground point 121 and the second feed point 122 are respectively located at two ends of the second radiator 120, and the second feed point 122 may be disposed at an end that is of the second radiator 120 that is close to the gap. The second radiator 120 may be coupled and grounded at the second ground point 121 through the third metal spring plate 123, and the second feed unit 202 may perform coupled feeding at the second feed point 122 through the fourth metal spring plate 124, to form a second antenna. In this case, the second antenna is a left-hand antenna.

It should be understood that a specific form of the first antenna or the second antenna is not limited in this application, and is merely used as an example.

Figure 17:
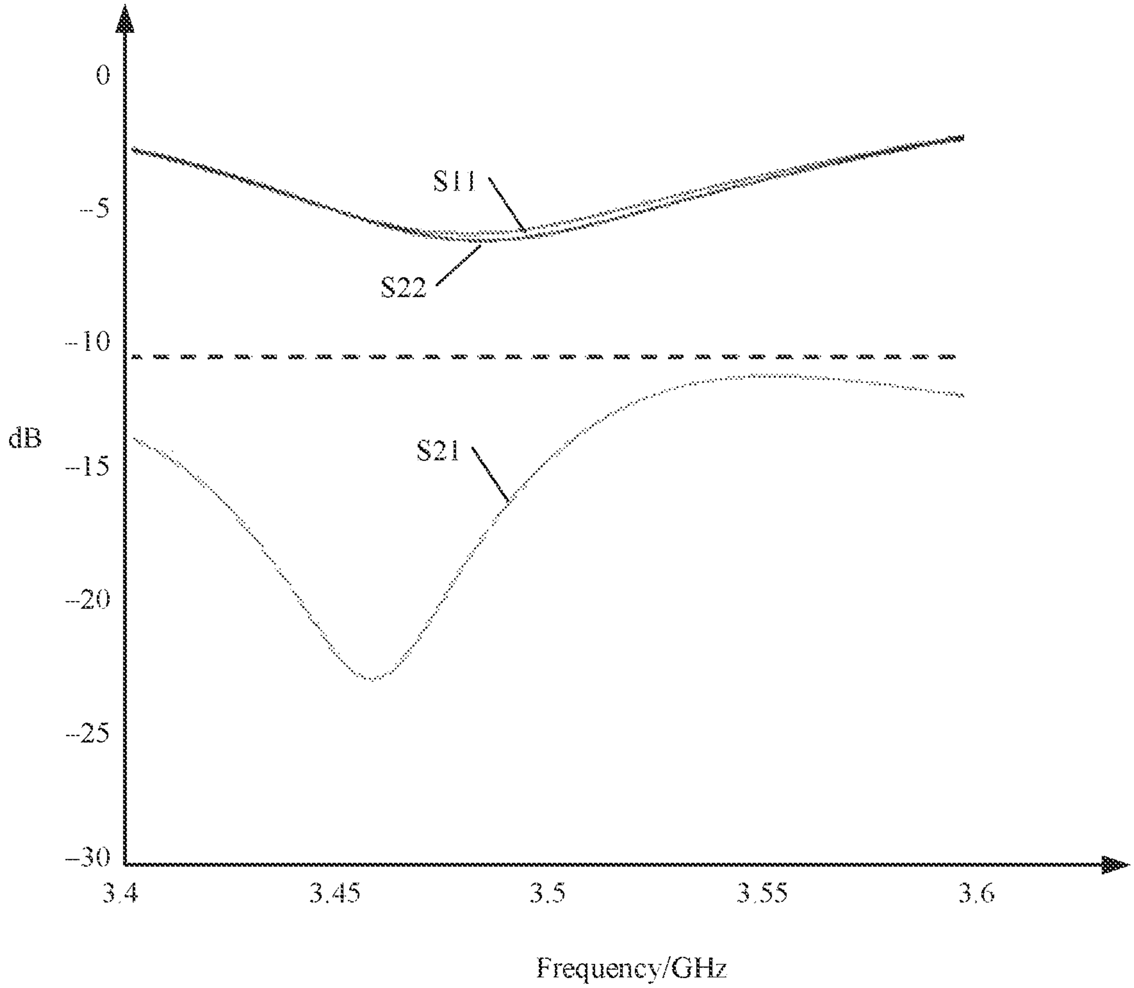
FIG. 17 is an S parameter simulation result of the antenna structure shown in FIG. 16.
Figure 18:
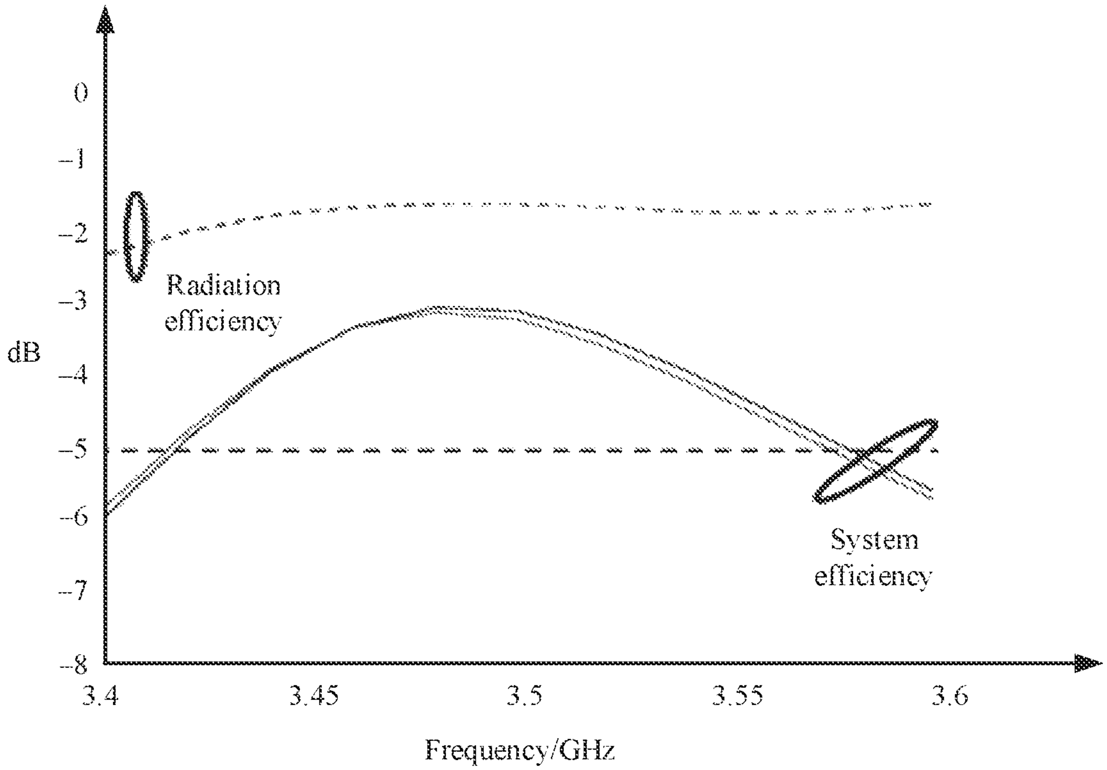
FIG. 18 is an efficiency simulation result of the antenna structure shown in FIG. 16.

FIG. 17 and FIG. 18 are schematic diagrams of simulation results of the antenna structure shown in FIG. 16. FIG. 17 is an S parameter simulation result of the antenna structure shown in FIG. 16. FIG. 18 is an efficiency simulation result of the antenna structure shown in FIG. 16.

As shown in FIG. 17, the antenna structure provided in this embodiment of this application may operate in an N77 frequency band (3.4 GHz to 3.6 GHz), and isolation in the frequency band is greater than 10.5 dB. As shown in FIG. 18, system efficiency in a frequency band from 3.4 GHz to 3.6 GHz may approximately meet −5 dB. At the same time, ECC is less than 0.2 in an operating frequency band, and this result is suitable for a MIMO system.

Figure 19:
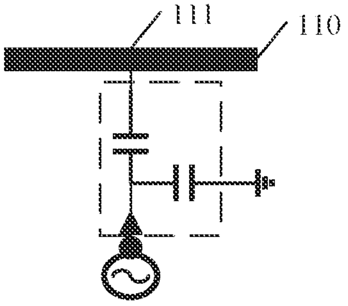
FIG. 19 is a schematic diagram of a matching network according to an embodiment of this application.

FIG. 19 is a schematic diagram of a matching network according to an embodiment of this application.

Optionally, the matching network may be disposed at the first feed point 111 of a first radiator. In this embodiment provided in this application, the first feed point is used as an example for description. Alternatively, the matching network may be disposed at a second feed point of a second radiator.

Matching with a feed unit is added at each feed point, so that a current in another frequency band at the feed point can be suppressed, and overall performance of an antenna is improved.

Optionally, as shown in FIG. 19, a first feed network may include a first capacitor connected in series and a second capacitor connected in parallel, and capacitance values of the first capacitor and the second capacitor may be successively 1 pF and 0.5 pF. It should be understood that a specific form of the matching network is not limited in this application, and the matching network may alternatively be a series capacitor and a parallel inductor.

Figure 20:
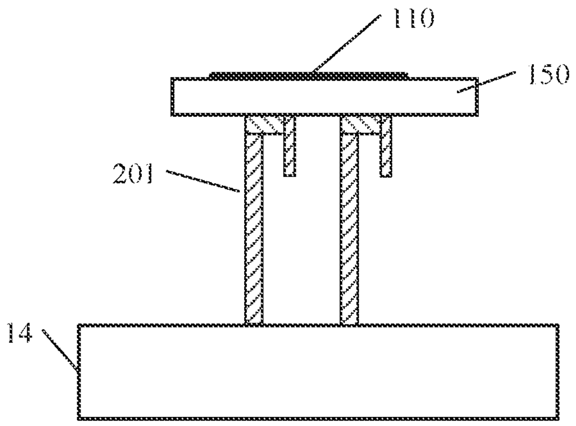
FIG. 20 is a schematic diagram of a structure of an antenna feeding solution according to an embodiment of this application.

FIG. 20 is a schematic diagram of a structure of an antenna feeding solution according to an embodiment of this application.

As shown in FIG. 20, a feed unit of an electronic device may be disposed on the PCB 14, and is electrically connected to a first feed point of a first radiator or a second feed point of a second radiator through a spring plate 201.

Optionally, the first radiator and the second radiator may be disposed on the antenna support 150, and are electrically connected to the feed unit on the PCB 14 through the spring plate 201. The spring plate 201 may be any one of the first metal spring plate, the second metal spring plate, the third metal spring plate, or the fourth metal spring plate in the foregoing embodiment.

It should be understood that the technical solution provided in this embodiment of this application may be further applied to a grounding antenna structure, where an antenna is connected to a ground plane through a spring plate. In the electronic device, the ground plane may be a middle frame or a PCB. The PCB is formed by press-fitting a plurality of layers of dielectric plates, and a metal plating layer exists in the plurality of layers of dielectric plates, and may be used as a reference ground of the antenna.

Figure 21:
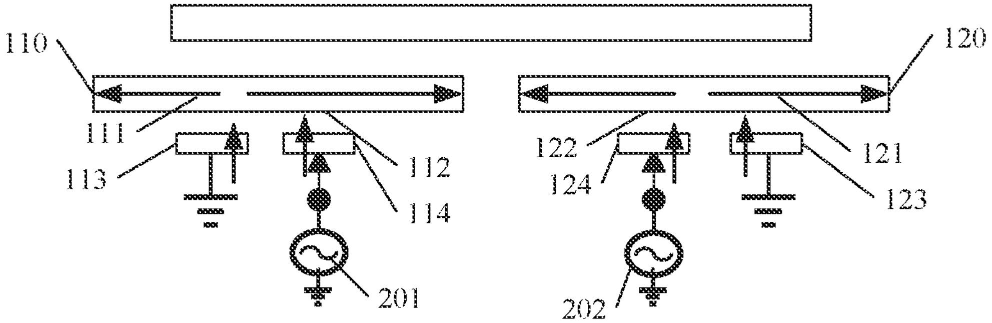
FIG. 21 is a schematic diagram of yet another antenna structure according to an embodiment of this application.

FIG. 21 is a schematic diagram of yet another antenna structure according to an embodiment of this application.

As shown in FIG. 21, a first radiator is used as an example, the first feed point 112 and the first ground point 111 may be disposed in the middle of the first radiator 110. In this case, a branch is additionally disposed on the first radiator, and the first antenna is a dual-branch coupling dual inverted-F antenna, to expand an operating frequency band range of the first antenna. Due to a similar principle, after a second antenna uses a same structure, an operating frequency band of the second antenna is also expanded.

Figure 22:
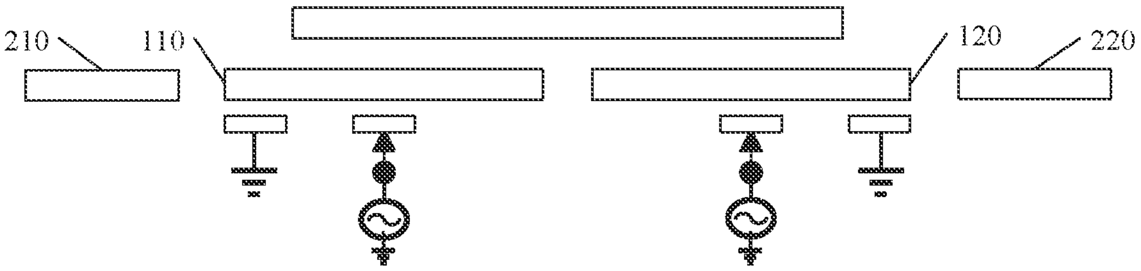
FIG. 22 is a schematic diagram of still yet another antenna structure according to an embodiment of this application.
Figure 23:
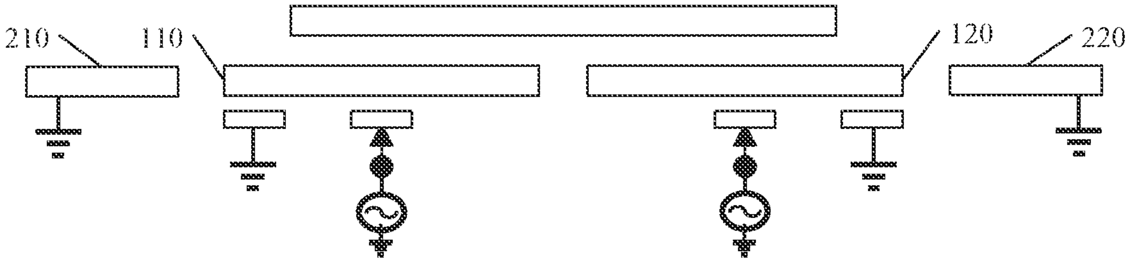
FIG. 23 is a schematic diagram of a further antenna structure according to an embodiment of this application.

FIG. 22 and FIG. 23 are each a schematic diagram of still yet another antenna structure according to an embodiment of this application.

As shown in FIG. 22, the antennas may further include a first parasitic stub 210 and a second parasitic stub 220. The first parasitic stub 210 may be located on side of the first radiator 110, and may be coupled and fed through the first radiator 120. The second parasitic stub 220 may be located on side of the second radiator 120, and may be coupled and fed through the second radiator 120.

Optionally, the first parasitic stub 210 may be disposed on an antenna support, a rear cover of an electronic device, or a PCB of an electronic device.

Optionally, the second parasitic stub 220 may be disposed on an antenna support, a rear cover of an electronic device, or a PCB of an electronic device.

Optionally, a length of the first parasitic stub 210 may be a half of an operating wavelength.

Optionally, a length of the second parasitic stub 220 may be a half of an operating wavelength.

As shown in FIG. 23, the first parasitic stub 210 may include a third ground point, and may be disposed at an end far away from the first radiator 110 for grounding of the first parasitic stub 210. In this case, the first parasitic stub 210 may form a monopole antenna, and a length of the first parasitic stub 210 may be a quarter of an operating wavelength. The second parasitic stub 220 may include a fourth ground point, and may be disposed at an end far away from the second radiator 120 for grounding of the second parasitic stub 220. In this case, the second parasitic stub 220 may form a monopole antenna, and a length of the second parasitic stub 220 may be a quarter of an operating wavelength.

It should be understood that a plurality of parasitic stubs may be disposed near a radiator, so that more antenna modes may be excited. This further improves an efficiency bandwidth and radiation of the antenna.

Figure 24:
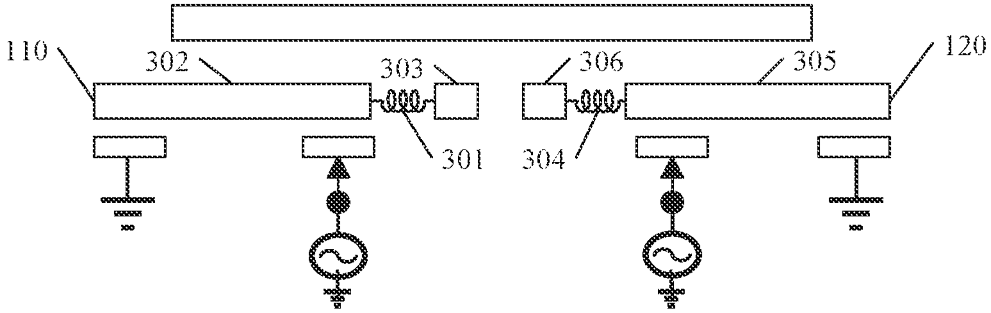
FIG. 24 is a schematic diagram of a still further antenna structure according to an embodiment of this application.
Figure 25:
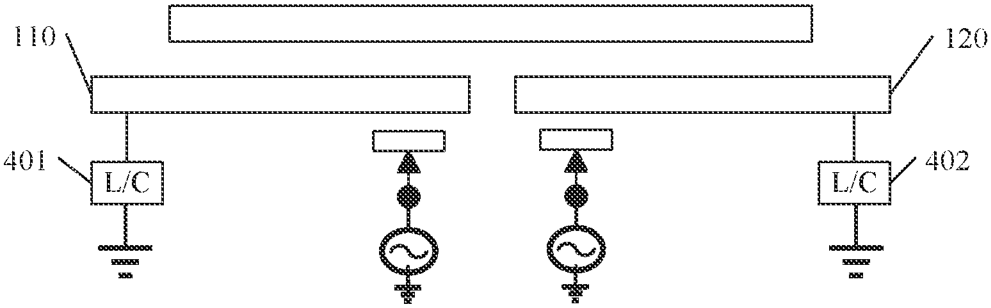
FIG. 25 is a schematic diagram of a yet further antenna structure according to an embodiment of this application.

FIG. 24 and FIG. 25 are each a schematic diagram of a further antenna structure according to an embodiment of this application.

As shown in FIG. 24, the first radiator 110 may include a first part 302, a second part 303, and a first inductor 301. One end of the first inductor 301 may be electrically connected to the first part 302, and the other end may be electrically connected to the second part 303. The second radiator 120 may include a third part 305, a second part 306, and a second inductor 304. One end of the second inductor 304 may be eclectically connected to the third part 305, and the other end may be electrically connected to the fourth part 306.

Optionally, the first inductor 301 or the second inductor 304 may be a distributed inductor.

It should be understood that a size of the antenna structure can be reduced by serially connecting an inductor to a radiator of the antenna.

As shown in FIG. 25, the antenna may further include a first element 401 and a second element 402. The first element 401 may be connected in series between a first ground point of a first radiator and a reference ground. The second element 402 may be connected in series between a second ground point of a second radiator and a reference ground. Optionally, the first element 401 or the second element 402 may be a capacitor, an inductor, or another lumped component.

It should be understood that a size of the antenna structure can be reduced by serially connecting the lumped component to a ground point of the antenna.

The antenna structure provided in this embodiment of this application may be used as a module component, and is disposed in an electronic device according to an antenna quantity requirement of the electronic device.

Figure 26:
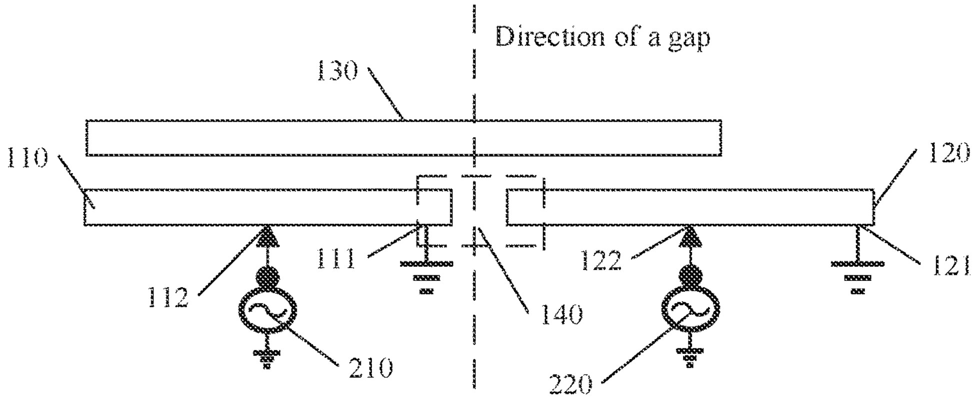
FIG. 26 is a schematic diagram of a still yet further antenna structure according to an embodiment of this application.

FIG. 26 is a schematic diagram of a still yet further antenna structure according to an embodiment of this application.

As shown in FIG. 26, the first feed point 112 may be disposed at an end that is of the first radiator 110 and that is away from the gap 140, and the first ground point 111 may be disposed between the first feed point 112 and the gap 140. The second ground point 121 may be disposed at an end that is of the second radiator 120 that is away from the gap 140, and the second feed point 122 may be disposed between the second ground point 121 and the gap 140.

It should be understood that, after the decoupling member 130 is additionally disposed in the antenna structure, isolation between the first antenna and the second antenna can be effectively improved. The antenna structure provided in this embodiment of this application is not limited to symmetry between a structure of the first antenna formed by the first radiator and a structure of the second antenna formed by the second radiator.

Optionally, the first radiator 110, the second radiator 120, and the decoupling member 130 may not be symmetrical along the gap 140. A location of the decoupling member 130 may be changed according to a design or production requirement, so that the decoupling member 130 is biased towards one of the radiators.

Figure 27:
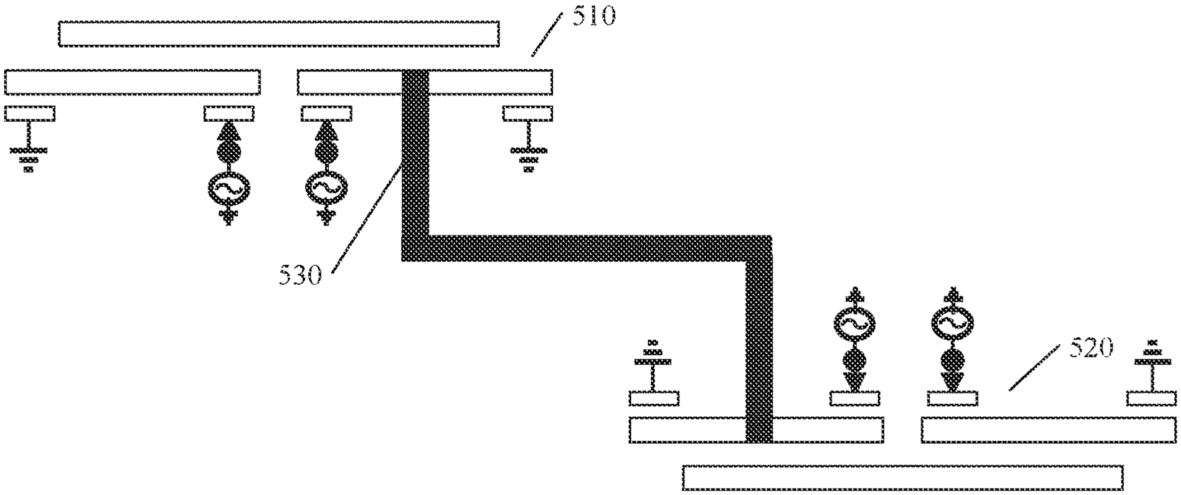
FIG. 27 is a schematic diagram of a structure of an antenna array according to an embodiment of this application.

FIG. 27 is a schematic diagram of a structure of an antenna array according to an embodiment of this application.

As shown in FIG. 27, the antenna array may include a third antenna 510, a fourth antenna 520, and a neutralization member 530.

The third antenna 510 or the fourth antenna 520 may be an antenna of any structure in the foregoing embodiments. The third antenna 510 and the fourth antenna 520 are arranged in a staggered manner, to improve isolation between feed points. In addition, radiators that are close to each other in the third antenna 510 and the fourth antenna 520 are indirectly coupled to the neutralization member 530, so as to improve isolation between feed points that are close to each other.

It should be understood that the third antenna 510 or the fourth antenna 520 is a dual-antenna structure having two antenna units. When disposed close to each other, dual-antenna structures may be decoupled by using the neutralization member 530, so as to improve isolation.

Optionally, the neutralization member 530 may be disposed on a surface of a rear cover of an electronic device.

Optionally, the neutralization member 530 may partially overlap a projection of the third antenna 510 on the rear cover in a first direction. The neutralization member 530 may partially overlap a projection of the fourth antenna 520 on the rear cover in the first direction.

Figure 28:
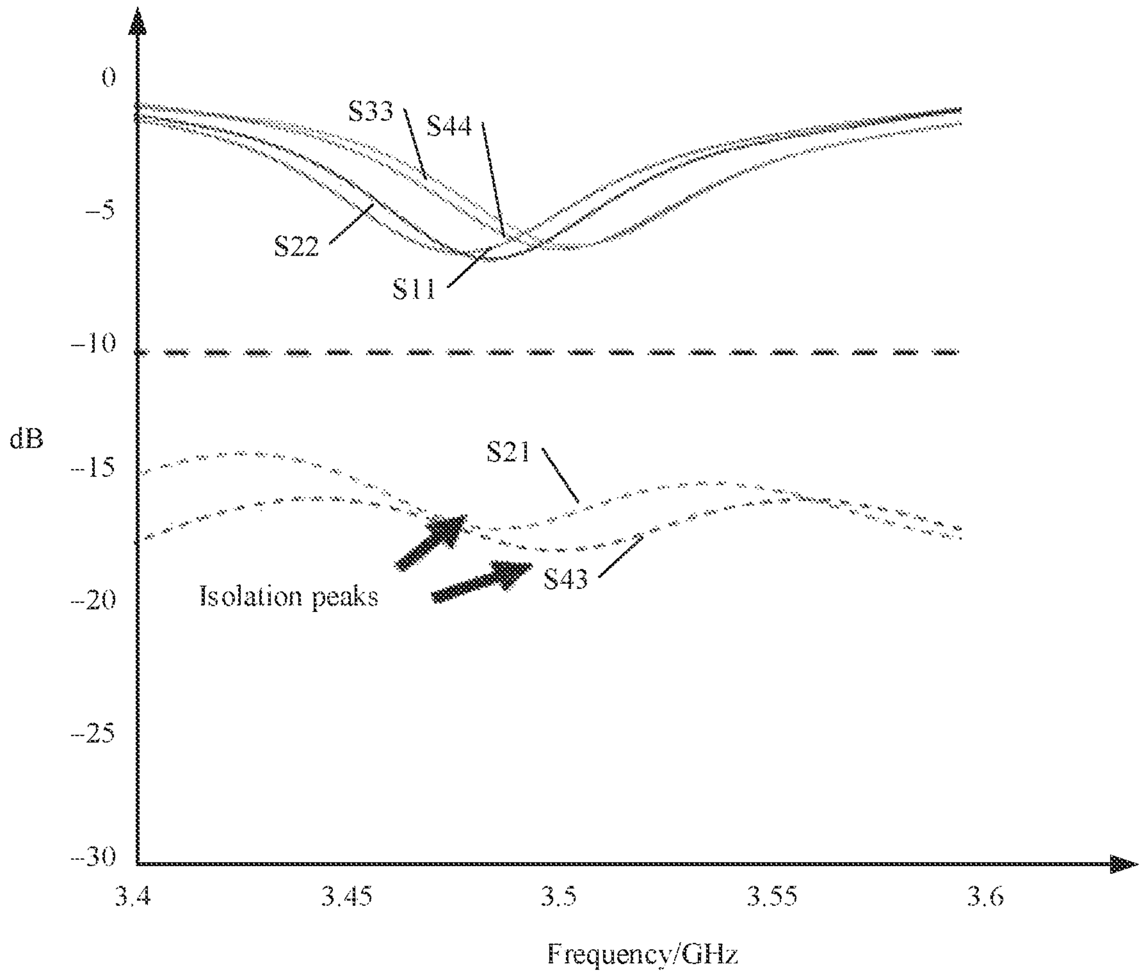
FIG. 28 is an S parameter simulation result of the antenna array shown in FIG. 27.
Figure 29:
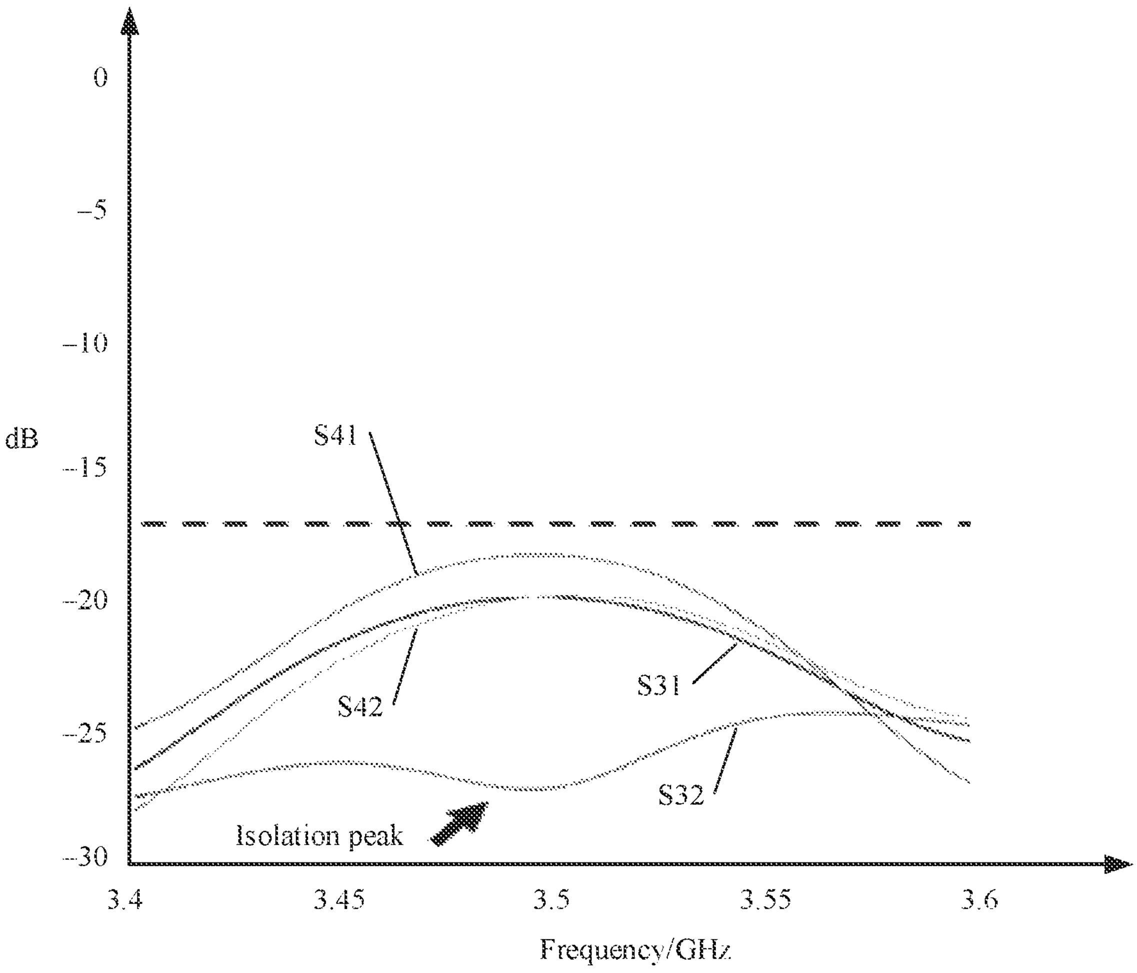
FIG. 29 is an isolation simulation result of the antenna array shown in FIG. 27.
Figure 30:
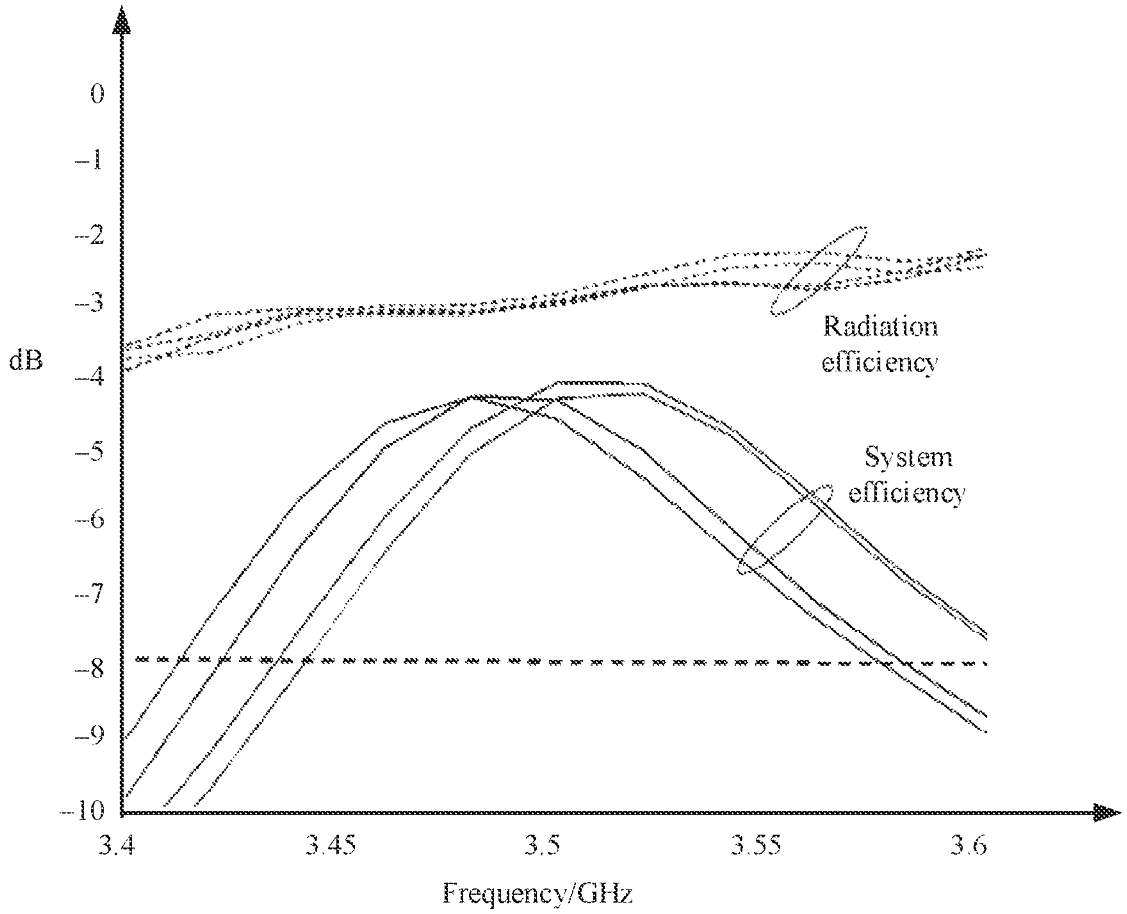
FIG. 30 is an efficiency simulation result of the antenna array shown in FIG. 27.

FIG. 28 to FIG. 30 are schematic diagrams of simulation results of the antenna array shown in FIG. 27. FIG. 28 is an S parameter simulation result of the antenna array shown in FIG. 27. FIG. 29 is an isolation simulation result of the antenna array shown in FIG. 27. FIG. 30 is an efficiency simulation result of the antenna array shown in FIG. 27.

As shown in the figure, isolation of the antenna array in an operating frequency band from 3.4 GHz to 3.6 GHz is greater than 13.5 dB, and system efficiency is greater than −8 dB.

It should be understood that, when the antenna structure provided in this embodiment of this application is applied to a MIMO system, a first antenna formed by a first radiator and a second antenna formed by a second radiator may operate in a time-division duplex (time-division duplex, TDD) mode or a frequency-division duplex (frequency-division duplex, FDD) mode. In other words, the first antenna and the second antenna may work within different frequency ranges. An operating frequency band of the first antenna may cover a receive frequency band of the FDD mode, and an operating frequency band of the second antenna may cover a transmit frequency band of the FDD mode. Alternatively, the first antenna and the second antenna may work at high and low power in a same frequency band in the FDD mode or the TDD mode. Operating frequencies of the first antenna and the second antenna are not limited in this application, and may be adjusted based on an actual design or production requirement.

In the several embodiments provided in this application, it should be understood that the disclosed system, apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device comprising:
- a rear cover located on a plane and comprising a first surface;
- a first radiator comprising:
  - a first ground point; and
  - a first feed point;
- a second radiator disposed to form a gap between the first radiator and the second radiator and comprising:
  - a second ground point; and
  - a second feed point;
- a first feed component coupled to the first feed point;
- a second feed component coupled to the second feed point; and
- a decoupling member disposed on the first surface and indirectly coupled to the first radiator and the second radiator, wherein the decoupling member does not overlap a first projection of the first radiator in a first direction, wherein the decoupling member does not overlap a second projection of the second radiator in the first direction, and wherein the first direction is perpendicular to the plane.

2. The electronic device of claim 1, wherein the first radiator comprises a first end distal from the gap, wherein the second radiator comprises a second end distal from the gap, wherein the first ground point is disposed at the first end, wherein the first feed point is disposed between the first ground point and the gap, wherein the second ground point is disposed at the second end, and wherein the second feed point is disposed between the second ground point and the gap.

3. The electronic device of claim 1, wherein the first radiator comprises a first end proximate to the gap, wherein the second radiator comprises a second end proximate to the gap, wherein the first feed point is disposed at the first end, and wherein the second feed point is disposed at the second end.

4. The electronic device of claim 1, wherein the first radiator comprises a first end distal from the gap, wherein the second radiator comprises a second end distal from the gap, wherein the first feed point is disposed at the first end, wherein the first ground point is disposed between the first feed point and the gap, wherein the second ground point is disposed at the second end, and wherein the second feed point is disposed between the second ground point and the gap.

5. The electronic device of claim 1, wherein the first radiator, the second radiator, and the decoupling member are symmetrical along the gap.

6. The electronic device of claim 1, further comprising an antenna support comprising a second surface, wherein the first radiator and the second radiator are disposed on the second surface.

7. The electronic device of claim 6, wherein the first surface is proximate to the antenna support.

8. The electronic device of claim 1, in a configuration whereby when the first feed component provides a feed, the second radiator is configured to:
- couple with the first radiator to generate a first induced current in a second direction; and
- couple with the decoupling member to generate a second induced current in a third direction,
- wherein the second direction is opposite to the third direction.

9. The electronic device of claim 1, in a configuration whereby when the second feed component provides a feed, the first radiator is configured to:

couple with the second radiator to generate a first induced current in a second direction; and couple with the decoupling member to generate a second induced current in a third direction, wherein the second direction is opposite to the third direction.

10. The electronic device of claim 1, wherein the first feed component and the second feed component are a same feed component.

11. The electronic device of claim 1, wherein a width of the gap comprises a range of 3 millimeters (mm) to 10 mm.

12. The electronic device of claim 1, further comprising a coupling gap disposed between the decoupling member and each of the first radiator and the second radiator, wherein the coupling gap comprises a range of 0.1 millimeters (mm) to 3 mm.

13. The electronic device of claim 1, wherein the first radiator or the second radiator is configured to generate a resonance, and wherein a length of the decoupling member is half of a wavelength corresponding to a resonance point of the resonance.

14. The electronic device of claim 1, further comprising:

a first metal spring plate comprising:

a third end that is grounded; and a fourth end coupled to the first radiator at the first ground point;

a second metal spring plate comprising:

a fifth end electrically coupled to a feed component; and a sixth end coupled to the first radiator at the first feed point;

a third metal spring plate comprising:

a seventh end that is grounded; and an eighth end coupled to the second radiator at the second ground point; and a fourth metal spring plate comprising:

a ninth end electrically coupled to the feed component; and a tenth end coupled to the second radiator at the second feed point.

15. The electronic device of claim 1, wherein the decoupling member is of a fold-line-shape.

16. The electronic device of claim 1, wherein the first radiator comprises a first side distal from the gap, wherein the second radiator comprises a second side distal from the gap, and wherein the electronic device further comprises:

a first parasitic stub disposed on the first side; and a second parasitic stub disposed on the second side.

17. The electronic device of claim 16, wherein the first parasitic stub comprises:

a third end distal from the first radiator; and a third ground point disposed at the third end, and wherein the second parasitic stub comprises:

a fourth end distal from the second radiator; and a fourth ground point disposed at the fourth end.

18. An electronic device comprising:

a rear cover located on a plane and comprising a first surface;

a first radiator comprising:

a first ground point; and a first feed point;

a second radiator disposed to form a gap between the first radiator and the second radiator and comprising:

a second ground point; and a second feed point;

a first feed component coupled to the first feed point;

a second feed component coupled to the second feed point; and a decoupling member disposed on the first surface and indirectly coupled to the first radiator and the second radiator, wherein when the first feed component provides a feed, the second radiator is configured to:

couple with the first radiator to generate a first induced current in a first direction; and couple with the decoupling member to generate a second induced current in a second direction, wherein the first direction is opposite to the second direction, and wherein when the second feed component provides a feed, the first radiator is configured to:

couple with the second radiator to generate a third induced current in a third direction; and couple with the decoupling member to generate a fourth induced current in a fourth direction, wherein the third direction is opposite to the fourth direction.

19. The electronic device of claim 18, wherein the first radiator comprises a first end distal from the gap, wherein the second radiator comprises a second end distal from the gap, wherein the first ground point is disposed at the first end, wherein the first feed point is disposed between the first ground point and the gap, wherein the second ground point is disposed at the second end, and wherein the second feed point is disposed between the second ground point and the gap.

20. The electronic device of claim 18, wherein the first radiator comprises a first end proximate to the gap, wherein the second radiator comprises a second end proximate to the gap, wherein the first feed point is disposed at the first end, and wherein the second feed point is disposed at the second end.

* * * * *